(12) United States Patent
Olarig

(10) Patent No.: US 6,954,209 B2
(45) Date of Patent: Oct. 11, 2005

(54) COMPUTER CPU AND MEMORY TO ACCELERATED GRAPHICS PORT BRIDGE HAVING A PLURALITY OF PHYSICAL BUSES WITH A SINGLE LOGICAL BUS NUMBER

(75) Inventor: Sompong Paul Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/115,551

(22) Filed: Apr. 3, 2002

(65) Prior Publication Data

US 2002/0109688 A1 Aug. 15, 2002

Related U.S. Application Data

(63) Continuation-in-part of application No. 09/730,948, filed on Dec. 6, 2000.

(51) Int. Cl.$^7$ ................................................. G09G 5/36
(52) U.S. Cl. ....................... 345/554; 345/520; 345/531; 345/535; 710/107
(58) Field of Search ................................ 345/554, 520, 345/531, 535; 710/107, 113, 115, 116, 240, 112, 306, 309, 313

(56) References Cited

U.S. PATENT DOCUMENTS

| | | | |
|---|---|---|---|
| 5,734,850 A | 3/1998 | Kenny et al. | 395/309 |
| 5,751,975 A | 5/1998 | Gillespie et al. | 395/306 |
| 5,857,086 A | 1/1999 | Horan et al. | 395/309 |
| 5,867,645 A | 2/1999 | Olarig | 395/185.01 |
| 5,878,237 A | 3/1999 | Olarig | 395/308 |
| 5,889,970 A | 3/1999 | Horan et al. | 395/306 |
| 5,923,860 A | 7/1999 | Olarig | 395/309 |
| 5,937,173 A | 8/1999 | Olarig et al. | 395/306 |
| 6,006,291 A * | 12/1999 | Rasmussen et al. | 710/38 |
| 6,018,810 A | 1/2000 | Olarig | 714/43 |
| 6,024,486 A | 2/2000 | Olarig et al. | 371/40.11 |
| 6,167,476 A | 12/2000 | Olarig et al. | 710/128 |
| 6,175,889 B1 | 1/2001 | Olarig | 710/129 |
| 6,192,455 B1 * | 2/2001 | Bogin et al. | 711/154 |
| 6,457,121 B1 * | 9/2002 | Koker et al. | 712/300 |
| 6,633,296 B1 * | 10/2003 | Laksono et al. | 345/502 |

* cited by examiner

*Primary Examiner*—Matthew C. Bella
*Assistant Examiner*—Hau Nguyen

(57) ABSTRACT

A core logic chip set in a computer system provides a bridge between processor host and memory buses and a plurality of Accelerated Graphics Port (AGP) buses. Each of the plurality of AGP buses have the same logical bus number. The core logic chip set has an arbiter having Request ("REQ") and Grant ("GNT") signal lines for each AGP device connected to the plurality of AGP physical buses. Each of the plurality of AGP buses has its own read and write queues to provide transaction concurrency of AGP devices on different ones of the plurality of AGP buses when the transaction addresses are not the same or are M byte aligned. Upper and lower memory address range registers store upper and lower memory addresses associated with each AGP device. Whenever a transaction occurs, the transaction address is compared with the stored range of memory addresses. If a match between addresses is found then strong ordering is used. If no match is found then weak ordering may be used to improve transaction latency times. AGP device to AGP device transactions may occur without being starved by CPU host bus to AGP bus transactions.

20 Claims, 14 Drawing Sheets

COMPUTER CPU AND MEMORY TO ACCELERATED GRAPHICS PORT BRIDGE HAVING A PLURALITY OF PHYSICAL BUSES WITH A SINGLE LOGICAL BUS NUMBER

CROSS REFERENCE TO RELATED PATENT APPLICATION

This patent application is a continuation-in-part of U.S. patent application Ser. No. 09/730,948, filed Dec. 6, 2000, entitled "Multi-mode Graphics Address Remapping Table for an Accelerated Graphics Port Device" by Sompong P. Olarig.

BACKGROUND OF THE INVENTION

1. Field of the Invention

The present invention relates to computer systems using a bus bridge(s) to interface a central processor(s), random access memory and input-output peripherals together, and more particularly, in utilizing in a computer system a bridge to a plurality of Accelerated Graphics Port ("AGP") buses wherein the plurality of AGP buses have the same logical bus number.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high-end individual personal computers) or linked together in a network by a "network server" which is also a personal computer that may have a few additional features specific to its purpose in the network. The network server may be used to store massive amounts of data, and may facilitate interaction of the individual workstations connected to the network for electronic mail ("Email"), document databases, video teleconferencing, whiteboarding, integrated enterprise calendar, virtual engineering design and the like. Multiple network servers may also be interconnected by local area networks ("LAN") and wide area networks ("WAN").

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system's microprocessor central processing unit ("CPU"). The peripheral devices' data transfer speeds are achieved by connecting the peripheral devices to the microprocessor(s) and associated system random access memory through high-speed expansion local buses. Most notably, a high-speed expansion local bus standard has emerged that is microprocessor independent and has been embraced by a significant number of peripheral hardware manufacturers and software programmers. This high-speed expansion bus standard is called the "Peripheral Component Interconnect" or "PCI."

Several official specifications and other documents relating to various aspects of the PCI Local Bus are currently available from the PCI Special Interest Group. Some examples of those documents include the PCI Local Bus Specification, revision 2.1; the PCI Local Bus Specification, revision 2.2 (PCI Conventional 2.2 Specification), the PCI-X 1.0a Specification, the Mini PCI Specification, the PCI/PCI Bridge Specification, revision 1.0; the PCI System Design Guide, revision 1.0; the PCI BIOS Specification, revision 2.1, the Small PCI 1.5s Specification, and the Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) (CPU) of the computer system communicates with main memory and with the peripherals that make up the computer system over these various buses. The microprocessor(s) communicate(s) to the main memory over a host bus to memory bus bridge. The main memory generally communicates over a memory bus through a cache memory bridge to the CPU host bus. The peripherals, depending on their data transfer speed requirements, are connected to the various buses which are connected to the microprocessor host bus through bus bridges that detect required actions, arbitrate, and translate both data and addresses between the various buses.

The choices available for the various computer system bus structures and devices residing on these buses are relatively flexible and may he organized in a number of different ways. One of the more desirable features of present day personal computer systems is their flexibility and ease in implementing custom solutions for users having widely different requirements. Slower peripheral devices may be connected to the ISA or EISA bus(es), other peripheral devices, such as disk and tape drives may be connected to a SCSI bus, and the fastest peripheral devices such as network interface cards (NICs) and video graphics controllers may require connection to the PCI bus. Information transactions on the PCI bus may operate at 33 MHz or 66 MHz clock rates and may be either 32 or 64-bit transactions.

A PCI device may he recognized by its register configuration during system configuration or POST, and the speed of operation of the PCI device may be determined during POST by reading the 66 MHz-CAPABLE hit in the status register, and/or by a hardwired electrical signal "M66EN" as an active "high" input to the 66 MHz PCI device card. If any of the PCI devices on the PCI bus are not 66 MHz capable then the non-66 MHz capable PCI card will deactivate the M66EN signal pin by pulling it to ground reference. If all PCI devices on the PCI bus are 66 MHz capable then M66EN remains active high and each 66 MHz capable PCI card will operate at a 66 MHz bus speed.

The PCI 2.1 and 2.2 Specifications supports a high 32-bit bus, referred to as the 64-bit extension to the standard low 32-bit bus. The 64-bit bus provides additional data bandwidth for PCI devices that require it. The high 32-bit extension for 64-bit devices requires an additional 39 signal pins: REQ64#, ACK64#, AD[63::32], C/BE[7::4]#, and PAR64. These signals are defined more fully in the PCI 2.1 and 2.2 Specifications incorporated by reference hereinabove. 32-bit PCI devices work unmodified with 64-bit PCI devices. A 64-bit PCI device must default to 32-bit operation unless a 64-bit transaction is negotiated. 64-bit transactions on the PCI bus are dynamically negotiated (once per transaction) between the master and target PCI devices. This is accomplished by the master asserting REQ64# and the target responding to the asserted REQ64# by asserting ACK64#. Once a 64-bit transaction is negotiated, it holds until the end of the transaction. Signals REQ64# and ACK64# are externally pulled up by pull up resistors to ensure proper behavior when mixing 32-bit and 64-bit PCI devices on the PCI bus. A central resource controls the state of REQ64# to inform the 64-bit PCI device that it is connected to a 64-bit bus. If REQ64# is deasserted when RST# is deasserted, the PCI device is not connected to a 64-bit bus. If REQ64# is asserted when RST# is deasserted, the PCI device is connected to a 64-bit bus.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM", and "PENTIUM PRO", "PENTIUM II", "PENTIUM III" and "PENTIUM 4" (registered trademarks of Intel Corporation). Advanced microprocessors are also manufactured by Advanced Micro Devices, Cyrix, IBM, Digital Equipment Corp., and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" ("AGP") initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, ("AGP1.0") the disclosure of which is hereby incorporated by reference. Enhancements to the AGP 1.0 Specification are included in the "Accelerated Graphics Port Interface Specification Revision 2.0," dated May 4, 1998 ("AGP 2.0"), the disclosure of which is hereby incorporated by reference. Both the AGP1.0 and AGP 2.0 Specifications are available from Intel Corporation, Santa Clara, Calif.

The AGP 1.0 interface specification uses the 66 MHz PCI (Revision 2.1) specification as an operational baseline, with three performance enhancements to the PCI specification which are used to optimize the AGP1.0 Specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/s"). The remaining AGP1.0 Specification does not modify the PCI specification, but rather provides a range of graphics-oriented performance enhancements for use by 3-D graphics hardware and software designers. The AGP1.0 Specification is neither meant to replace nor diminish full use of the PCI standard in the computer system. The AGP1.0 Specification creates an independent and additional high speed local bus for use by 3-D graphics devices such as a graphics controller, wherein the other input-output ("I/O") devices of the computer system may remain on any combination of the PCI, SCSI, EISA and ISA buses. The AGP1.0 Specification supports only 32-bit memory addressing. Further definition and enhancement of the AGP 1.0 Specification is more fully defined in "Compaq's Supplement to the 'Accelerated Graphics Port Interface Specification Version 1.0'," Revision 0.8, dated Apr. 1, 1997, which is hereby incorporated by reference.

The AGP 2.0 Specification supports 64-bit memory addressing, which is beneficial for addressing memory sizes allocated to the AGP device that are larger than 2 GB. The AGP 2.0 Specification also includes several other enhancements. For example, the AGP 2.0 Specification supports 1) 4x transfer mode with low (1.5V voltage electrical signals that allows four data transfers per 66 MHz clock cycle, providing data throughput of up to 1GB/second; 2) five additional sideband signals; 3) a fast write protocol; 4) new input/output buffers; and 5) new mechanical connectors. The AGP 2.0 Specification is hereby incorporated by reference herein.

A draft version of the AGP 8x Specification (AGP Specification 3.0, Draft Version 0.95) was promulgated by Intel in May, 2001. The AGP 3.0 data bus introduces AGP 8x transfer mode, which provides a peak theoretical bandwidth of 2.1 GB/s (32 bits per transfer at 533 MT/s). Both the common clock and source synchronous data strobe operation and protocols are similar to those employed by AGP 2.0 with all modifications guided by the need to support the 8x data transfer rate of AGP 3.0's source synchronous mode. The AGP 3.0 Specification, Draft Version 0.95, is hereby incorporated by reference herein.

Regardless of the version of the AGP specification, to functionally enable the AGP 3-D graphics bus, new computer system hardware and software are required. This requires new computer system core logic designed to function as a host bus/memory bus/PCI bus to AGP bus bridge meeting the AGP1.0 or AGP 2.0 Specifications, and new Read Only Memory Basic Input Output System ("ROM BIOS") and Application Programming Interface ("API") software to make the AGP dependent hardware functional in the computer system. The computer system core logic must still meet the PCI and/or PCI-X standards referenced above and facilitate interfacing the PCI bus(es) to the remainder of the computer system. In addition, new AGP compatible device cards must be designed to properly interface, mechanically and electrically, with the AGP bus connector.

AGP and PCI device cards are not physically or electrically interchangeable even though there is some commonality of signal functions between the AGP and PCI interface specifications. The AGP specifications only make allowance for a single AGP device on an AGP bus. Whereas the PCI specification allows two PCI devices on a PCI bus running at 66 MHz. The single AGP device is capable of functioning in a 1x mode (264 MB/s peak), a 2x mode (532 MB/s peak), a 4x mode (1 GB/s peak) or an 8x mode (theoretical limit of 2.1 GB/s peak). The AGP bus is defined as a 32 bit bus, or four bytes per data transfer. The PCI bus is defined as either a 32 bit or 64 bit bus, or four or eight bytes per data transfer, respectively. The AGP bus, however, has additional sideband signals which enables it to transfer blocks of data more efficiently than is possible using a PCI bus.

The purpose of the original AGP bus and the extensions set forth in subsequent versions of the specification is to An AGP bus running in the 2x mode (532 MB/s peak) may provide sufficient video data throughput to allow increasingly complex 3-D graphics applications, particularly games, to run on personal computers. Some personal computer uses do not require high end 3-D graphics, but would greatly benefit from having an additional AGP card slot for accepting an additional input-output device such as another video graphics card (dual head monitors), a high speed network interface card ("NIC"), a SCSI adapter, a wide area network digital router, and the like. Since the AGP specification is comprised of a superset of the 66 MHz, 32 bit PCI specification, a PCI device may also function on the AGP bus (different card slot connectors for the AGP and PCI device cards would be necessary). Thus, embedded (directly connected to the computer system motherboard) or card slot pluggable AGP and PCI devices could share the same AGP/PCI bus, controller and arbiter of a core logic chip set used in a computer system.

Another advance in the flexibility and ease in the implementation of personal computers is the emerging "plug and play" standard in which each vendor's hardware has unique coding embedded within the peripheral device. Plug and play software in the computer operating system software auto configures the peripheral devices found connected to the various computer buses such as the various PCI, AGP, EISA and ISA buses. In addition, the plug and play operating system software configures registers within the peripheral devices found in the computer system as to memory space allocation, interrupt priorities and the like.

Plug and play initialization generally is performed with a system configuration program that is run whenever a new device is incorporated into the computer system. Once the configuration program has determined the parameters for each of the devices in the computer system, these parameters may be stored in non-volatile random access memory (NVRAM). An industry standard for storage of both plug and play and non-plug and play device configuration information is the Extended System Configuration Data (ESCD) format. The ESCD format is used to store detailed configuration information in the NVRAM for each device. This ESCD information allows the computer system read only memory (ROM) basic input/output system (BIOS) configuration software to work together with the configuration utilities to provide robust support for all peripheral devices, both plug and play, and non-plug and play.

During the first initialization of a computer, the system configuration utility determines the hardware configuration of the computer system including all peripheral devices connected to the various buses of the computer system. Some user involvement may be required for device interrupt priority and the like. Once the configuration of the computer system is determined, either automatically and/or by user selection of settings, the computer system configuration information is stored in ESCD format in the NVRAM. Thereafter, the system configuration utility need not be run again. This greatly shortens the startup time required for the computer system and does not require the computer system user to have to make any selections for hardware interrupts and the like, as may be required in the system configuration utility.

However, situations often arise which require rerunning the system configuration utility to update the device configuration information stored in the NVRAM when a new device is added to the computer system. One specific situation is when a PCI peripheral device interface card having a PCI—PCI bridge is placed into a PCI connector slot of a first PC1 bus of the computer system. The PCI—PCI bridge, which creates a new PCI bus, causes the PCI bus numbers of all subsequent PCI buses to increase by one (PCI—PCI bridge may be a PCI interface card having its own PCI bus for a plurality of PCI devices integrated on the card or for PCI bus connector slots associated with the new PCI bus). This creates a problem since any user configured information such as interrupt request (IRQ) number, etc., stored in the NVRAM specifies the bus and device/function number of the PCI device to which it applies. Originally, this information was determined and stored in the NVRAM by the system configuration utility during the initial setup of the computer system and contains configuration choices made at that time.

During normal startup of the computer system (every time the computer is turned on by the user), a Power On Self Test (POST) routine depends on prior information stored in the NVRAM by the system configuration utility. If the PCI bus numbers of any of the PCI cards change because a new PCI bus was introduced by adding a new PCI—PCI bridge to the computer, the original configuration information stored in the NVRAM will not be correct for those PCI cards now having different bus numbers, even though they remain in the same physical slot numbers. This situation results in the software operating system not being able to configure the PCI cards now having bus numbers different than what was expected from the information stored in the NVRAM. This can be especially bothersome for a PCI device such as a controller which has been configured as a system startup device, but now cannot be used to startup the computer system because its registers have not been initialized during POST to indicate that it is supposed to be the primary controller.

The PCI 2.1 and 2.2 Specifications allows two PCI devices on a PCI bus running at 66 MHz. When more than two 66 MHz PCI devices are required in a computer system, a PCI to PCI bus bridge must be added. The PCI to PCI bus bridge is one load, the same as a PCI device card. Thus, adding PCI to PCI bridges is not very efficient when 66 MHz operation of the PCI buses is desired. Each time a PCI to PCI bridge is added to the computer system it creates a new PCI bus having a new PCI bus number. Multiple PCI to PCI bridges running at 66 MHz would typically have to be connected together sequentially, i.e. one downstream from another. Sequentially connecting the PCI to PCI bridges causes increased propagation time and bus to bus handshake and arbitration problems.

PCI devices are connected to the computer system CPU through at least one PCI bus. The at least one PCI bus is in communication with the host bus connected to the CPU through a Host/PCI bus bridge. There exists on the computer system motherboard a set of electrical card edge connector sockets or slots" adapted to receive one PCI card for each slot. These PCI card slots are numbered as to their physical location on the motherboard and define a unique characteristic for each of the respective PCI card slots and the PCI cards plugged therein. The PCI card slots may be interspersed with other ISA or EISA bus connector slots also located on the computer system motherboard.

The PCI bus closest to the CPU, i.e., the PCI bus just on the other side of the host/PCI bridge is always bus number zero. Thus, any PCI device card plugged into a PCI slot connected to the number zero PCI bus is defined as being addressable at PCI bus number zero. Each PCI card comprises at least one PCI device that is unique in the computer system. Each PCI device has a plurality of registers containing unique criteria such as Vender ID, Device ID, Revision ID, Class Code Header Type, etc. Other registers within each PCI device may be read from and written to so as to further coordinate operation of the PCI devices in the computer system. During system configuration, each PCI device is discovered and its personality information such as interrupt request number, bus master priority, latency time and the like are stored in the system non-volatile random access memory (NVRAM) using, for example, the ESCD format.

The number of PCI cards that may he connected to a PCI bus is limited, however, because the PCI bus is configured for high speed data transfers. The PCI specification circumvents this limitation by allowing more than one PCI bus to exist in the computer system. A second PCI bus may be created by connecting another Host-to-PCI bridge to the host bus of the CPU. The second PCI bus connected to the downstream side (PCI bus side) of the second Host-to-PCI bridge is defined as "number one" if there are no other PCI/PCI bridges connected to the PCI bus number zero.

Other PCI buses may be created with the addition of PCI/PCI bridges. For example, a PCI card having a PCI/PCI bridge is plugged into a PCI slot connected to PCI bus number zero on the motherboard of the computer system. In this example, bus number zero is the primary bus because the first host/PCI bridge's PCI bus is always numbered zero. The upstream side of the PCI/PCI bridge is connected to PCI bus number zero and the down stream side of the PCI/PCI bridge now creates another PCI bus which is number one. The prior PCI bus number one on the down stream side of the second Host-to-PCI bus now must change to PCI bus number two. All PCI/PCI bridges connected to or down stream of PCI bus number zero are sequentially numbered. This causes the number of the PCI bus that was created by the second Host-to-PCI bridge to be incremented every time a new PCI bus is created with a PCI/PCI bridge down stream from PCI bus number zero.

When two PCI/PCI bridges are connected to the PCI bus number zero, two PCI buses, numbers one and two, are created. For example, a first PCI card having a PCI/PCI bridge is plugged into motherboard PCI slot number 1, creating PCI bus number one with the PCI/PCI bridge of the first PCI card. A second PCI card having a PCI/PCI bridge is plugged into motherboard PCI slot number 2, creating PCI bus number two with the PCI/PCI bridge of the second PCI 50 card. PCI bus numbers one or two may be connected to PCI devices on the respective first and second PCI cards, or there may be additional PCI card slots on one or both of the first and second PCI cards. When slots are available on a PCI card having a PCI/PCI bridge, additional PCI cards having PCI/PCI bridges may be plugged into the PCI card slots, thus creating more PCI buses. Each PCI/PCI bridge handles information to and from the CPU host bus and a downstream PCI device according to the PCI Specifications referenced above. All embedded PCI devices on the computer system motherboard are assigned a physical slot number of zero (0) and must be differentiated by their respective PCI device and bus numbers.

A computer system may be configured initially with two Host-to-PCI bridges connected to the CPU host bus, which results in the creation of two PCI buses numbered zero and one. These two PCI buses are available for connecting the PCI devices used in the computer system to the CPU. The system configuration program is run once to establish the personality of each of the PCI devices connected to the two PCI buses, to define interrupt priorities and the like. The configuration information for each of the PCI devices and their associated PCI bus numbers may be stored in the NVRAM using the ESCD format. Thereafter each time the computer system is powered up, the configuration information stored in the NVRAM may be used for initializing and configuring the PCI devices during startup of the operating system and eventually running the application programs.

Initial startup of the computer system is by programs stored in the computer system read only memory (ROM) basic input/output system (BIOS) whose contents may be written into random access memory (RAM) space along with the configuration information stored in the NVRAM so that the computer system may do its startup routines more quickly and then load the operating system software from its hard disk. During the POST routine the computer system depends on the configuration information stored in the NVRAM to access the PCI devices at the PCI bus numbers determined during execution of the original system configuration program.

All of the stored PCI device bus numbers in the NVRAM must match the actual PCI bus numbers for the PCI devices (hard disk SCSI interface, etc.) required during startup of the computer system. If the PCI bus numbers stored in the NVRAM do not match the actual PCI bus numbers, proper computer system operation may be impaired. PC bus numbers may change if new PCI/PCI bridges are added to the computer system after the configuration program was run to store the system configuration settings in the NVRAM in ESCD format.

Another requirement of the PCI 2.1 and 2.2 Specifications is the PCI bridges must follow certain transaction ordering rules to avoid "deadlock" and/or maintain "strong" ordering. To guarantee that the results of one PCI initiator's write transactions are observable by other PCI initiators in the proper order of occurrence, even though the write transactions may be posted in the PCI bridge queues, the following rules must be observed:

1) Posted memory writes moving in the same direction through a PCI bridge will complete on the destination bus in the same order they complete on the originating bus;

2) Write transactions flowing in one direction through a PCI bridge have no ordering requirements with respect to write transactions flowing in the other direction of the PCI bridge; and 3) Posted memory write buffers in both directions must he flushed or drained before starting another read transaction.

Newer types of input-output devices such as "cluster" I/O 55 controllers may not require "strong" ordering but are very sensitive to transaction latency.

Computer system peripheral hardware devices, i.e., hard disks, CD-ROM readers, network interface cards, video graphics controllers, modems and the like, may be supplied by various hardware vendors. These hardware vendors must supply software drivers for their respective peripheral devices used in each computer system even though the peripheral device may plug into a standard PCI bus connector. The number of software drivers required for a peripheral device multiplies for each different computer and operating system. In addition, both the computer vendor, operating system vendor and software driver vendor must test and certify the many different combinations of peripheral devices and the respective software drivers used with the various computer and operating systems. Whenever a peripheral device or driver is changed or an operating system upgrade is made, retesting and recertification may be necessary.

The demand for peripheral device driver portability between operating systems and host computer systems, combined with increasing requirements for intelligent, distributed input-output ("I/O") processing has led to the development of an "Intelligent Input/Output" ("$I_2O$") specification. The basic objective of the $I_2O$ specification is to provide an I/O device driver architecture that is independent of both the specific peripheral device being controlled and the host operating system. This is achieved by logically separating the portion of the driver that is responsible for managing the peripheral device from the specific implementation details for the operating system that it serves. By doing so, the part of the driver that manages the peripheral device becomes portable across different computer and operating systems. The $I_2O$ specification also generalizes the nature of communication between the host computer system and peripheral hardware, thus providing processor and bus technology independence. The $I_2O$ specification, entitled "Intelligent I/O ($I_2O$) Architecture Specification," Draft Revision 1.5, dated March 1997, is available from the $I_2O$ Special Interest Group, 404 Balboa Street, San Francisco, Calif. 94118; the disclosure of this $I_2O$ specification is hereby incorporated by reference.

In the $I_2O$ specification an independent intelligent input-output processor (1OP) is proposed which may be implemented as a PCI device card. The 1OP connects to a PCI bus and is capable of performing peer-to-peer PCI transactions with I/O PCI devices residing on the same or other PCI buses. A problem may exist, however, in computer systems having one or more high speed central processing units that perform a plurality of host to PCI transactions. These host to PCI transactions may occur so frequently and quickly that PCI to PCI transactions may be starved due to lack of PCI bus availability.

What is needed is an apparatus, method, and system for a computer that provides a core logic chip set having a bridge for a CPU(s) host bus and random access memory bus to a plurality of AGP buses wherein the plurality of AGP buses have the same logical bus number and are capable of operation at 66 MHz or faster. In addition, a way to determine the strength of write transaction ordering is desired so that maximum advantage may he used to reduce bus transaction latency by taking transactions out of order when these transactions are determined not to require "strong" ordering. Further, a way to prevent AGP to AGP transactions from being starved by host-to-PCI (or AGP) transactions is desired.

SUMMARY OF THE INVENTION

The present invention provides a computer system having a core logic chip set that is capable of bridging between a CPU(s) host bus, a random access memory bus and a plurality of physical Accelerated Graphics Port ("AGP") buses, wherein the plurality of physical AGP buses have the same logical bus number and are capable of operating at 66 MHz or faster. In the present invention, each of the plurality of physical AGP buses may be connected to two AGP devices or two AGP device card connectors. One or more of the physical AGP buses also may be connected to more than two AGP devices or AGP device card connectors and operate at 33 MHz. The plurality of physical AGP buses all have the same logical AGP bus number of zero since no intermediate AGP to AGP bridges are needed nor desired in the present invention. Thus, identification of AGP devices in the computer system during startup is greatly simplified because there can be no confusion as to which AGP bus numbers the AGP devices are associated. Configuration information stored in the NVRAM is also simplified since the same AGP bus number (zero) is typically associated with each AGP device. A AGP-to AGP bridge on a multi-function AGP device card would create a new AGP bus number (only to that card and the multiple AGP devices thereon), however, and is contemplated in the present invention. An arbiter(s) in the core logic chip set provides Request ("REQ") and Grant ("GNT") signal lines for each one of the AGP devices connected to the plurality of physical AGP buses in the computer system. The embodiments of the present invention contemplate a core logic chip set which may be one or more integrated circuit devices such as an Application Specific Integrated Circuit ("ASIC"), Programmable Logic Array ("PLA"), and the like.

The AGP bus is designed to provide connectivity to very high bandwidth devices such as 3-D graphics and gigabit input-output ("I/O") devices. Specifically, the AGP bus is designed to operate at a clock frequency of 66 MHz. However, any AGP bus operational speed is contemplated herein for the present invention. Those of ordinary skill in the art will recognize that the AGP bus represents a compatible superset of the buses set forth in the original PCI 2.1 and 2.2 Specifications.

As contemplated herein, the core logic chip set is connected to a plurality of physical AGP buses capable of running at 66 MHz. These 66 MHz physical AGP buses may also be connected to a combination of PCI (or PCI-X) devices embedded on the computer system motherboard and/or AGP device cards plugged into AGP card edge connectors also on the computer system motherboard. In the present invention, there is no practical limit to the number of physical AGP buses, therefore, as many PCI, AGP and PCI-X devices and card slot connectors as needed may he utilized in the computer system. Typically, the number of PCI, AGP or PCI-X devices would be limited by the number of Initialization Device Select ("IDSEL") addresses that are available and how the address data lines AD [31::11] are configured on the computer system motherboard to the embedded AGP devices and/or the AGP card slot connectors. Therefore, the host to AGP bus bridge, according to the present invention, will handle transactions with the AGP devices as if they were all on the same AGP bus.

In the present invention, AGP device to AGP device transactions are also contemplated herein. When an AGP device on a physical AGP bus addresses another AGP device's memory or I/O addresses on the same physical AGP bus or on another physical AGP bus, this is referred to hereinafter as "peer-to-peer" PCI bus transactions. It is contemplated in the present invention that peer-to-peer transactions may be enabled or disabled by setting a control register bit in the core logic. The present invention may broadcast the peer-to-peer transaction address onto the physical AGP buses so that the intended AGP target may respond. Once the target AGP device responds, the peer-to-peer transaction is completed. There is no host bus or memory bus activity required for peer-to-peer AGP bus transactions. Concurrent transaction activity may occur, however, on other physical AGP buses between the memory bus and/or host bus as more fully described hereinafter. This is especially useful when using intelligent, distributed input-output ("I/O") processing as more fully defined in the "Intelligent Input/Output" ("$I_2O$") specification, entitled "Intelligent I/0 ($I_2O$) Architecture Specification," Draft Revision 1.5, dated March 1997; the disclosure of which is incorporated by reference hereinabove.

In an embodiment of the present invention, the host or memory to AGP bus bridge handles requests from AGP devices on the different physical AGP buses, as mentioned above, just as if they came from the same logical AGP bus. This embodiment of the present invention allows only one AGP transaction to occur at a time and the arbiter thereof only asserts GNT# to the AGP device associated with the current transaction. However, the next AGP transaction requested on a different physical AGP bus can be pipelined, i.e., the AGP device making the next AGP bus transaction request may have its GNT# signal issued a few clocks earlier than it could if both of the AGP devices were on the same physical AGP bus. In this embodiment, the core logic chip set arbiter detects that the current bus master is about to terminate the current transaction or target initiated termination, then and only then will the GNT# signal be issued to the AGP device requesting the next transaction. This easily handles AGP locked cycles which require the arbiter to wait until the current lock cycle transactions are complete before allowing another AGP device transaction to occur.

Another embodiment of the present invention provides in the core logic chip set, separate queues for each of the plurality of physical AGP buses so that AGP devices on the different physical AGP buses may perform transactions concurrently when the transactions from the different physical AGP buses are defined by different memory addresses so long as these memory addresses have been marked as prefetchable. An AGP device can mark an address range as prefetchable if there are no side effects on reads, the AGP device returns all bytes on reads regardless of the byte enables, and the core logic host bridge can merge processor(s) writes without causing errors.

For example, a AGP read transaction is occurring on the physical AGP bus A and there is a bus request on the physical AGP bus B. The arbiter can assert (GNT# to the AGP device on the physical AGP bus B immediately without waiting for the current transaction to be completed on the physical AGP bus A. Once the command and address are valid on the physical AGP bus B, the core logic chip set of the present invention inserts at least one wait state to compare the transaction address of physical bus A with the transaction address of physical bus B. If the transaction addresses of physical buses A and B are prefetchable memory addresses, and they are not accessing the same cache-line nor are they M byte aligned, where $M=16 \times 2^n$ and $n$ is 0, 1, 2, 3, 4, etc., the transaction request from the physical AGP bus B is allowed to continue until completion. If the transaction addresses are I/O addresses, not prefetchable memory addresses, or physical buses A and B are accessing the same cache-line or are M byte aligned (the transaction addresses from the two physical AGP buses overlap the M byte address space), then the transaction request from the physical AGP bus B may be delayed by issuing a "retry" to the PCI bus B initiator.

A "retry" is defined in the PCI 2.1 Specification as a termination requested by a target before any data is transferred because the target is busy and temporarily unable to process the transaction. A retry is issued during the first data phase which prevents any data being transferred. Retry is indicated to the initiator by asserting Stop ("STOP#") and deasserting Target Ready (TRDY#) while keeping Device Select("DEVSEL#") asserted. This tells the initiator that the target does not intend to transfer the current data item (TRDY# deasserted) and that the initiator must stop the transaction on this data phase (STOP# asserted). The continued assertion of DEVSEL# indicates that the initiator must retry the transaction at a later time (when the commonly addressed transaction on the AGP physical bus A has completed). Furthermore, the initiator must use the exact same address, command and byte enables. If it is a write transaction, it must use exactly the same data in the first data phase. The access must be retried until the transaction is completed.

Another embodiment of the present invention comprises at least two memory address range registers for each AGP device in the computer system. At least a top address and a bottom address range register is contemplated for each AGP device. The computer system software or application programming interface (API) software for a specific AGP device may be used to program the top and bottom address range registers for the specific AGP device, i.e., an upper memory address is written into the top address range register and a lower memory address is written into the bottom address range register. This may be performed during computer system POST or dynamically at any time by different API or applications programs. The range of addresses between the upper and lower memory addresses for each AGP device may be used by the present invention in determining whether "strong" or "weak" ordering of AGP write transactions are appropriate.

"Strong" ordering requires that the results of one AGP initiator's write transactions are observable by other AGP initiators in the proper order of occurrence, even though the write transactions may be posted in the AGP bridge queues. This is accomplished by the following rules:

1) Posted memory writes moving in the same direction through a AGP bridge will complete on the destination bus in the same order they complete on the originating bus;

2) Write transactions flowing in one direction through a AGP bridge have no ordering requirements with respect to write transactions flowing in the other direction of the AGP bridge; and 3) Posted memory write buffers in both directions must be flushed or drained before starting another read transaction.

These "strong" ordering rules may increase AGP bus transaction latency. Newer types of input-output devices such as "cluster" I/O controllers may not require "strong"

transaction ordering, but are very sensitive to AGP bus transaction latency. According to the present invention, strong ordering for a AGP device may be required for a range of memory addresses defined as the upper and lower addresses stored in the respective AGP device's top and bottom address range registers. Whenever write transactions are pending that fall within any AGP device's current or pending write transactions, then the "strong" ordering rules for bus transactions are appropriate. However, when there are no current or pending write transactions falling within the respective AGP device's memory address range requiring strong ordering rules, the present invention may do out-of-order AGP transactions, i.e., read transactions may bypass posted write transactions. It is also contemplated herein that additional range registers for each AGP device may also define "weak" ordering addresses for the respective AGP device. In this way a determination of whether to use "strong" or weak" transaction ordering rules for current and pending queued transactions may be made.

Another embodiment of the present invention comprises registers which store the I/O and memory address ranges used by the AGP devices connected to each physical AGP bus. Each AGP device is assigned unique memory and/or I/O address ranges by the configuration software. These memory and I/O address ranges are stored in the AGP device's configuration registers during initialized at startup (POST). The present invention may also store the memory and I/O address ranges of each AGP device connected to a physical AGP bus. When a transaction is initiated, the present invention may determine which physical AGP bus the target AGP device is on by the transaction address. When the transaction address is within an address range associated with a particular physical AGP bus, only that AGP bus will broadcast the transaction. Thus, only the physical AGP bus connected to the intended AGP target is activated by the transaction. This feature allows more efficient concurrent transactions within the core logic of the present invention because host-to-AGP bus and/or memory-to-AGP bus transactions may occur concurrently with the AGP-to-AGP transactions.

Still another embodiment of the present invention prevents peer-to-peer AGP transactions from being starved by repetitive host-to-AGP transactions. Host-to-AGP transactions may occur rapidly and frequently enough where attempts by one AGP device to transact with another AGP device is blocked by the higher priority host-to-AGP transactions. The present invention solves this problem by allowing at least one PCI-to-AGP transaction to occur between host-to-AGP transactions. If a AGP-to-AGP transaction is pending and a host-to-AGP transaction is completing or has just completed, the present invention asserts a "retry" signal to the processor host bus if another host-to-AGP transaction request is pending. This "retry" signal causes the host processor initiating the host-to-AGP transaction request to abort its request and do something else. Later the same host-to-AGP transaction request will be initiated again. This allows the processor(s) on the host bus to continue other transactions while the pending AGP-to-AGP transaction is allowed to proceed. Implementation of this "retry" signal will vary with the type of processor(s) used in the computer system. For example, using the Intel Corp., PENTIUM PRO processor, a "Retry Response" is allowed when DEFER# (with HITM# inactive) is asserted during the Snoop Phase. With this Retry Response, the response agent informs the request agent (host processor) that the transaction must be retried. The "Pentium Pro Family Developer's Manual," ISBN 1-5552-251-5 is available from Intel Corporation, and is incorporated herein by reference. For the Intel Corp., PENTIUM and 80486 processors, a "retry" is when the Backoff input (BOFF#) is asserted to abort all outstanding host bus cycles that have not yet completed. The processor remains in bus hold until BOFF# is deasserted at which time the processor restarts the aborted bus cycle(s) in their entirety. "Pentium and Pentium Pro Processors and Related Products," ISBN 1-5552-251-5 is available from Intel Corporation, and is incorporated herein by reference. Once the current AGP-to-AGP transaction is underway, i.e., is the last transaction to occur, the "retry" signal is deasserted on the host bus and another host-to-AGP transaction request is allowed to occur regardless of whether another AGP-to-AGP transaction is pending. The present invention thus alternates between host-to-AGP transactions and AGP-to-AGP transactions if both are pending.

The present invention eliminates the need to use PCI to PCI bridges to increase AGP card slots on the computer system motherboard, thus, multiple delayed transactions and potential deadlock cycles may be avoided. Further, AGP transactions on different physical AGP buses may be concurrent if the transaction addresses are different. "Strong" or "weak" ordering rules may be used for transactions depending on memory address ranges programmed for each AGP device.

The present invention additionally allows the computer system to utilize more than two of the higher data throughput (bandwidth) AGP devices such as additional video graphics controller cards or high speed NICs. This is accomplished by using a plurality of physical AGP buses without the problems associated with PCI-to-PCI bridges and the confusion and possible system crashes associated with multiple PCI bus numbers, which can easily change when a PCI-to-PCI bridge is added, or PCI device cards are moved from one PCI bus slot to another in the computer.

The present invention contemplates individual queues for each of the plurality of physical AGP buses in the computer system. Also contemplated is checking the next transaction request address with the current transaction request address by inserting a wait state to the AGP device requesting the next transaction so as to compare the current transaction address with the next transaction address to determine if concurrent transactions are appropriate. If the compared addresses neither match nor are M byte aligned, where $M=16 \times 2^n$ and n is 0, 1, 2, 3, 4, etc., concurrent transactions may proceed. If the addresses match or are M byte aligned, then a retry cycle is asserted to the PCI initiator requesting the next transaction.

In the present invention, out-of-order AGP transactions may occur when current or pending transactions are "weak" in relation to one another as determined by "strong" or "weak" ordering address ranges programmed for each AGP device. The present invention also allows a AGP-to-AGP transaction to occur between host-to-AGP transactions.

Other features and advantages of the invention will be apparent from the following description of the invention, given for the purpose of disclosure and taken in conjunction with the accompanying drawings.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
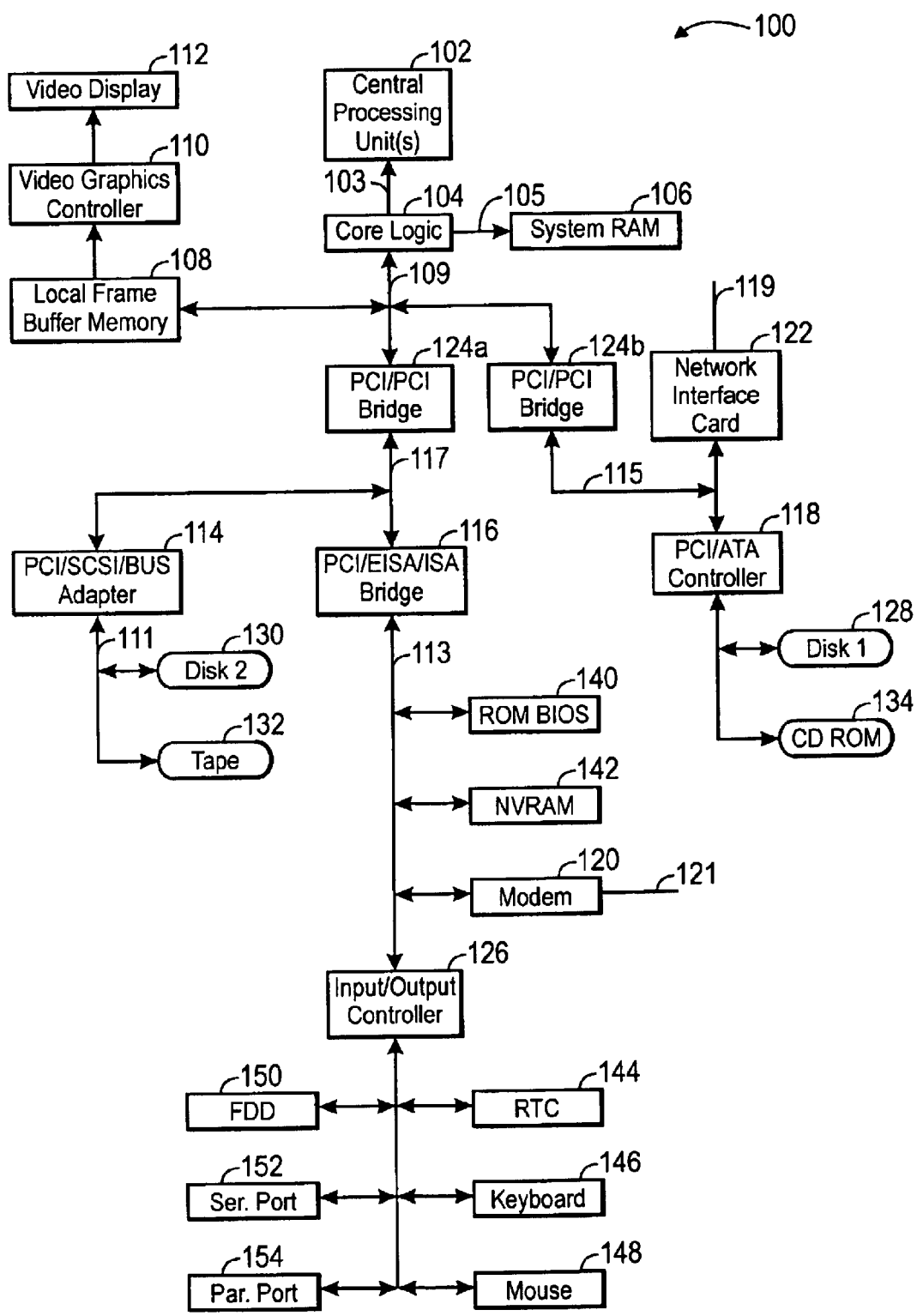
FIG. 1 is a schematic block diagram of a prior art computer system.

The following patents are hereby incorporated by reference:

U.S. Pat. No. 6,175,889, filed Oct. 21, 1998, entitled "Apparatus, Method and System for a Computer CPU and Memory to High Speed Peripheral Interconnect Bridge Having a Plurality of Physical Buses with a Single Logical Bus Number" by Sompong P. Olarig;

U.S. Pat. No. 5,878,237, filed Jul. 11, 1997, entitled "Apparatus, Method and System for a Computer CPU and Memory to PCI Bridge Having a Plurality of Physical PCI Buses" by Sompong P. Olarig.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention is an apparatus, method and system for providing a core logic chip set in a computer system capable of implementing a bridge between host processor and memory buses and a plurality of AGP buses wherein the plurality of AGP buses all have the same logical bus number. The present invention is capable of supporting all features of the AGP protocol. In addition, the present invention is capable of mixed mode operation, wherein a mix of PCI-only and AGP compatible devices operate concurrently. Computer systems utilizing the present invention experience less latency with multiple AGP compatible devices than prior art bridges and configurations.

The AGP bus was developed to have sufficient data bandwidth for high performance peripherals such as a video controller, a high speed network interface card(s), a hard disk controller(s), a SCSI adapter, a wide area network digital router, and the like. According to the AGP Specifications, an AGP bus is designed to support up to two loads. Sophisticated graphics and increased network data transfer requirements have put upward pressure on the PCI buses for faster data transfers between the computer system main memory, host processor(s), peripherals and data from other computers on the network. Accordingly, computer systems that implement a more than two AGP devices may be desirable. If so, a plurality of AGP to AGP bridges may be required. to provide enough AGP device card slots for a computer system such as a network server or graphics workstation. In this situation, AGP-to-AGP bus bridges would create new AGP bus numbers and introduce increasingly complex data protocol and handshake requirements, multiple delayed transactions, additional bus latency, and potential deadlock cycles.

For illustrative purposes, prior art references and preferred embodiments of the present invention are described hereinafter for computer systems utilizing the Intel x86 microprocessor architecture and certain terms and references will be specific to that processor platform. AGP is an interface standard, however, that is hardware independent and may be utilized with any host computer designed for this interface standard. It will be appreciated by those skilled in the art of computer systems that the present invention may be adapted and applied to any computer platform utilizing the AGP interface standard including those systems utilizing the Windows, UNIX, OS/2 and Linux operating systems.

Referring now to the drawings, the details of preferred embodiments of the present invention are schematically illustrated. Like elements in the drawings will be represented by like numbers, and similar elements will he represented by like numbers with a different lower case letter suffix.

Referring to FIG. 1, a schematic block diagram of a prior art computer system utilizing multiple PCI buses is illustrated. The prior art computer system is generally indicated by the numeral 100 and comprises a central processing Unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, a PCI/IDE controller 118, and PCI/PCI bus bridges 124a, 124b. Single or multilevel cache memory (not illustrated) may also he included in the computer system 100 according to the current art of microprocessor computer systems. The CPU 102 may be a plurality of CPUs 102 in a symmetric or asymmetric multi-processor configuration.

The CPU(s) 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a first PCI bus 109. The local frame buffer 108 is connected between the video graphics controller 110 and the first PCI bus 109. PC/PCI bridges 124a, 124b are connected to the first PCI bus 109. The PCI/SCSI bus adapter 114 and PCI/EISA/ISA bridge 116 are connected to the PCI/PCI bridge 124a through a second PCI bus 117. The PCI/IDE controller 118 and a network interface card ("NIC") 122 are connected to the PCI/PCI bridge 124b through a third PCI bus 115. Some of the PCI devices such as the Video controller 110 and NIC 122 may plug into PCI connectors on the computer system 100 motherboard (not illustrated). Three PCI buses 109, 117 and 115 are illustrated in FIG. 1, and may have logical PCI bus numbers of zero, one and two, respectively.

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI/SCSI bus adapter 114 must be configured to respond to commands from the CPU 102 over the PCI buses 109 and 117, and transfer information from the disk 130 to the CPU 102 via buses 117, 109 and 103. The PCI SCSI bus adapter 114 is a PCI device and remains platform independent. Therefore, separate hardware independent commands are used to setup and control any PCI device in the computer system 100. These hardware independent commands, however, are located in a PCI BIOS contained in the computer system ROM BIOS 140. The PCI BIOS is firmware that is hardware specific but meets the general PCI specification. Plug and play, and PCI devices in the computer system are detected and configured when a system configuration program is executed. The results of the plug and play, and PCI device configurations are stored in the NVRAM 142 for later use by the startup programs in the ROM BIOS 140 (PCI BIOS) which configure the necessary computer system 100 devices during startup.

Figure 2:
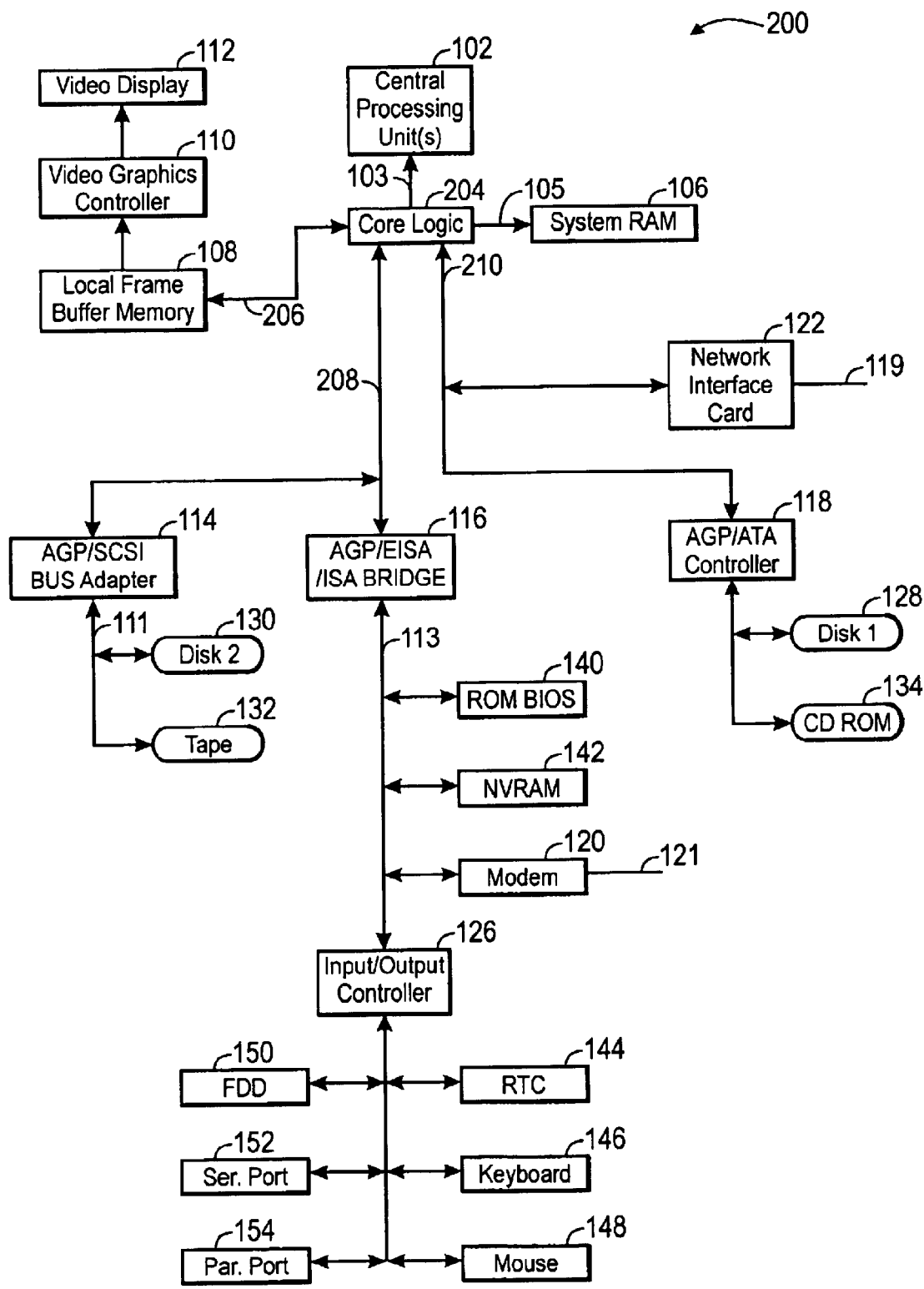
FIG. 2 is a schematic block diagram of a computer system according to the present invention.

Referring now to FIG. 2, a schematic block diagram of a computer system utilizing the present invention is illustrated. The computer system, according to the present invention, is generally indicated by the numeral 200. Some of the general functions, components and signal paths not dealing with the present invention are the same as in the computer system 100 (FIG. 1), described above. Noticeably absent from the computer system 200, however, are the AGP/AGP bridges 124a, 124b Instead of requiring multiple AGP/AGP bridges for a plurality of 66 MHz AGP devices, the present invention utilizes a plurality of AGP bus interfaces in the core logic 204 which are connected to physical AGP buses 206, 208, 210. The AGP buses 206, 208, 210 are capable of operation at 66 MHz using both 32-bit and 64-bit transactions, as more fully defined in the AGP Specifications incorporated by referenced above.

The video graphics controller 110 is connected to the local frame buffer memory 108 which is connected to the core logic 204 through the AGP bus 206. The AGP/SCSI bus adapter 114 and AGP/EISA/ISA bridge 116 are connected the core logic 204 through the AGP bus 208. The AGP/IDE controller 118 and a network interface card ("NIC") 122 are connected to the core logic 204 through the AGP bus 210. All of the remaining components of the computer system 200 are connected and operate the same as the components of the above mentioned computer system 100 (FIG. 1). The AGP buses 206, 208, 210 are physically separate AGP buses capable of independent concurrent transactions but appear to the computer S startup and operating system software as one logical AGP bus. This greatly simplifies keeping track of AGP devices connected in the computer system since all AGP devices are on only one logical AGP bus, and each AGP device has its own unique device number (e.g., 1–16). No longer does the computer system software need to remember which AGP device is on which AGP bus number, nor is there ever a possibility that a AGP device bus number will change, causing a system startup problem. Furthermore, no AGP to AGP bridge type one configuration transactions take place. The disclosed embodiment greatly simplifies and speeds up recognition of the AGP devices in the computer system and improves transaction times thereof for the computer system 200.

Figure 3:
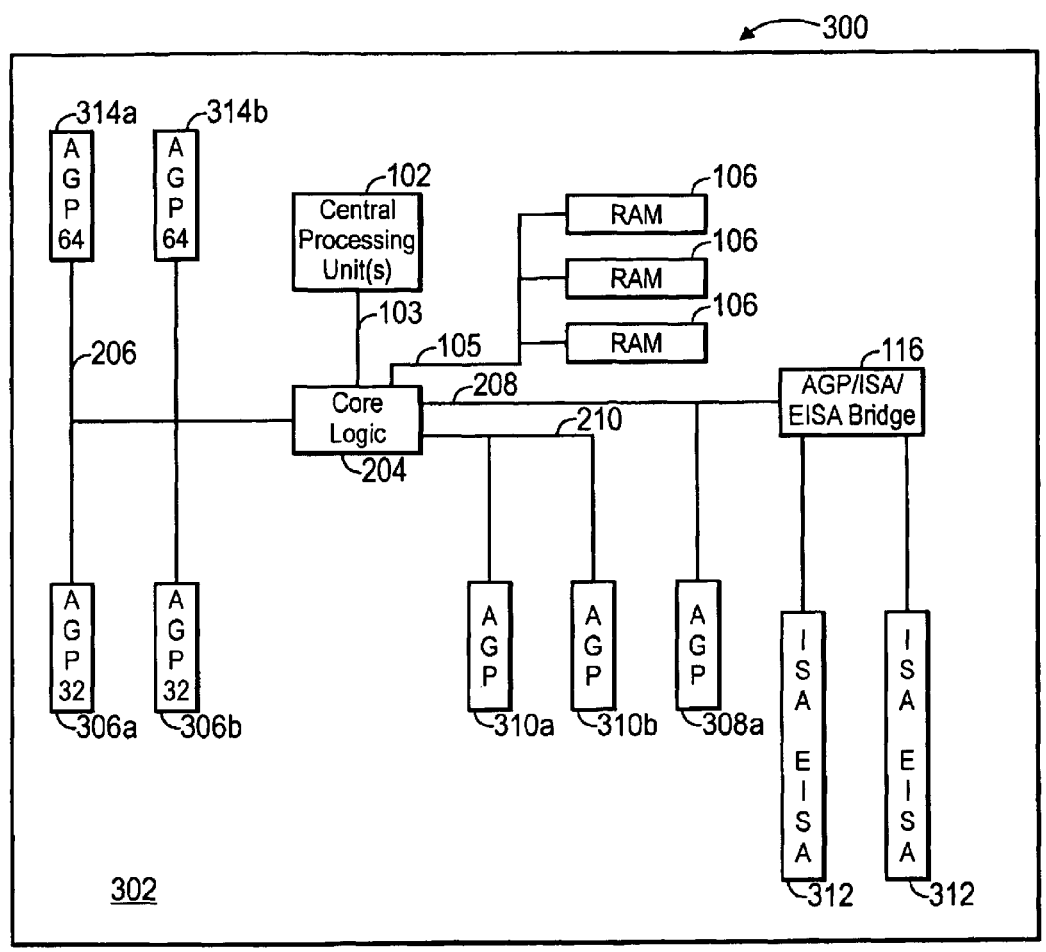
FIG. 3 is a schematic block diagram in plan view of the present invention according to the computer system of FIG. 2.

Referring now to FIG. 3, a schematic diagram of a computer system motherboard according to FIG. 2 is illustrated in plan view. The computer system motherboard 300 comprises printed circuit board 302 on which components and connectors are mounted thereto. The printed circuit board 302 comprises conductive printed wiring which is used to interconnect the components and connectors thereon. The conductive printed wiring (illustrated as buses 103, 105, 206, 208 and 210) may be arranged into signal buses having controlled impedance characteristics. On the printed circuit board is the core logic 204, CPU(s) 102, RAM 106, AGP/ISA/EISA bridge 116, ISA/EISA connectors 312, 66 MHz, 32-bit AGP connector 308a (AGP physical bus 208), AGP connectors 310a, 310b (AGP physical bus 210), AGP connectors 306a, 306b and 64-bit AGP connectors 314a, 314b (AGP physical bus 206). The connectors 314a, 314b carry the additional signals required for 64-bit data width AGP operation. Either or both 32-bit and 64-bit data width, 66 MHz AGP buses are contemplated herein.

Figure 4:
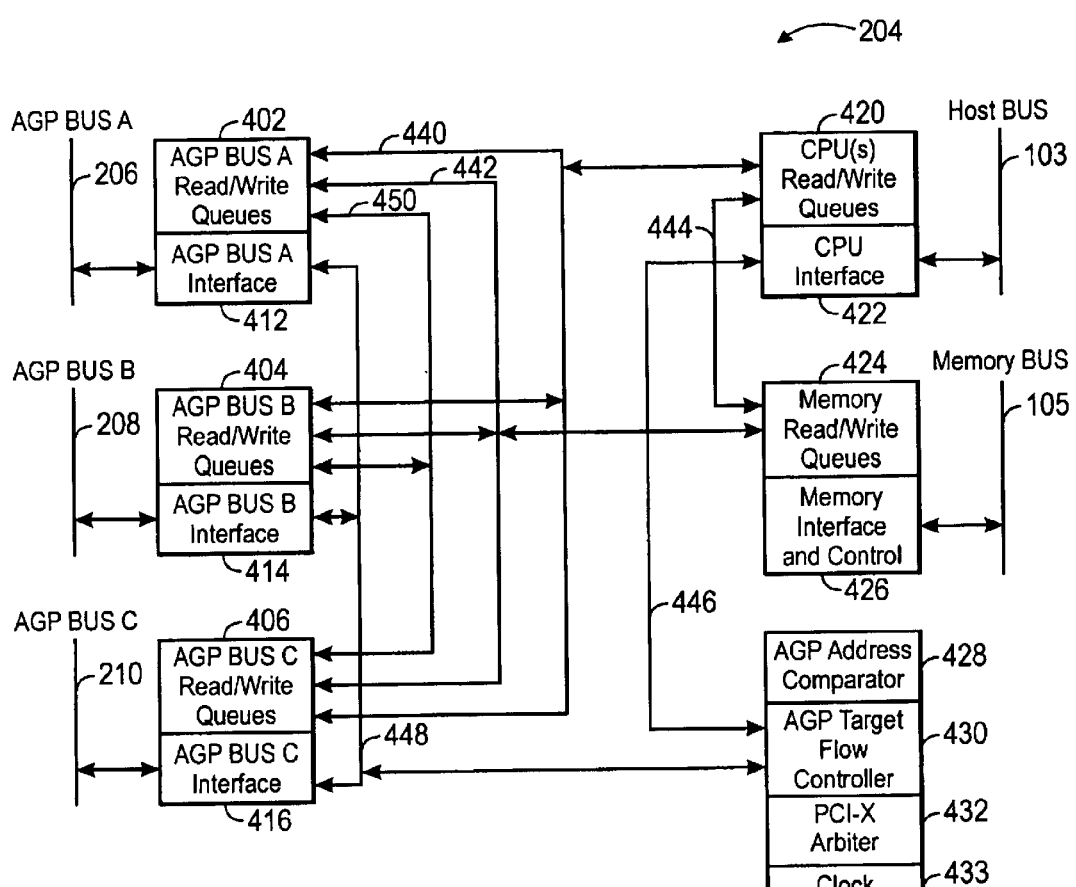
FIG. 4 is a schematic functional block diagram of the present invention according to the computer system of FIGS. 2 and 3.

Referring now to FIG. 4, a schematic functional block diagram of the present invention according to the computer system of FIGS. 2 and 3 is illustrated. The core logic 204 comprises AGP read/write queues 402, 404. 406; CPU read/write queues 420, memory read/write queues 424, AGP bus interfaces 412, 4114, 416; CPU interface 422, memory interface and control 426, AGP address comparator 428, AGP target flow controller 430, and AGP arbiter 432. In the preferred embodiment of the present invention, a clock 433 is included to synchronize data transmissions among the various devices. Such a clock could be, for example, a phase locked loop (PLL) clock.

Address, data and control information is transferred between the AGP read/write queues 402, 404, 406 and the CPU read/write queues 420 over internal bus 440, between the memory read/write queues 424 over internal bus 442, between the AGP read/write queues 402, 404, 406 over internal bus 450, and between the memory read/write queues 424 and CPU read/write queues 420 over internal bus 444. The AGP bus interfaces 412, 414, 416 are connected to the AGP buses 206, 208, 210, respectively, and transfer information to and from the AGP read/write queues 402, 404, 406. The CPU interface 422 is connected to the CPU host bus 103 and transfers information to and from the CPU read/write queues 420. The memory interface and control 426 is connected to the memory bus 105 and transfers information to and from the memory read/write queues 424.

The AGP read/write queues 402, 404, 406 in conjunction with the physically separate AGP buses 206, 208, 210 allow independent concurrent transactions for AGP devices on these buses. The AGP address comparator 428 monitors transaction addresses on each of the AGP buses 206, 208, 210 and compares the transaction addresses for each of these AGP buses to determine if the AGP devices (each on a separate AGP bus) are trying to access the same cacheline or M byte aligned, where $M=16\times2^n$ and n is 0, 1, 2, 3, 4, etc. At least one wait state may be introduced in the PCI bus transaction timing cycles by the PCI target flow controller 430, which is a subset of an AGP target flow controller, so sufficient time is available to compare the different physical PCI transaction addresses with one another. If the transaction address comparison indicates no M byte aligned address commonality, then concurrent transactions from the different physical AGP buses are allowed to proceed over the internal buses 440, 442, 450. However, if there is any M byte aligned address commonality between the transactions then a "retry" is issued to the second AGP device having the M byte aligned address request. This is necessary if either or both of the AGP devices on the separate physical AGP buses 206, 208, 210 is performing or wants to perform a write transaction. When only read transactions are being performed or requested to be performed by the AGP devices, then byte aligned addresses are irrelevant to concurrent transactions among the separate physical AGP buses if the addresses are prefetchable AGP device to AGP device transactions may occur directly between the AGP read/write queues 402, 404, 406 over internal bus 450. When an AGP device on a physical AGP bus addresses another AGP device's memory or I/O addresses on the same physical AGP bus or on another physical PCI bus, this is referred to hereinafter as "peer-to-peer" AGP bus transactions. Peer-to-peer transactions may he enabled or disabled by setting a control register bit (not illustrated) in the core logic 204. The present invention may broadcast the peer-to-peer transaction address to all of the physical AGP buses 206, 208, 210 so that the intended AGP target may respond. Once the target AGP device responds, the peer-to-peer transaction has been negotiated and will complete according to the AGP Specification. The CPU read/write queues 420, or memory read/write queues 424 are not required for peer-to-peer AGP bus transactions. Concurrent transaction activity may occur, however, on other physical AGP buses between the memory bus 105 and/or host bus 103 as described herein. This is especially useful when using intelligent, distributed input-output ("I/0") processing operating system software as more fully defined in the "Intelligent Input/Output" ("I$_2$O") specification, entitled "Intelligent I/O (I$_2$0) Architecture Specification," Draft Revision 1.5, dated March 1997, incorporated by reference hereinabove.

Figure 4A:
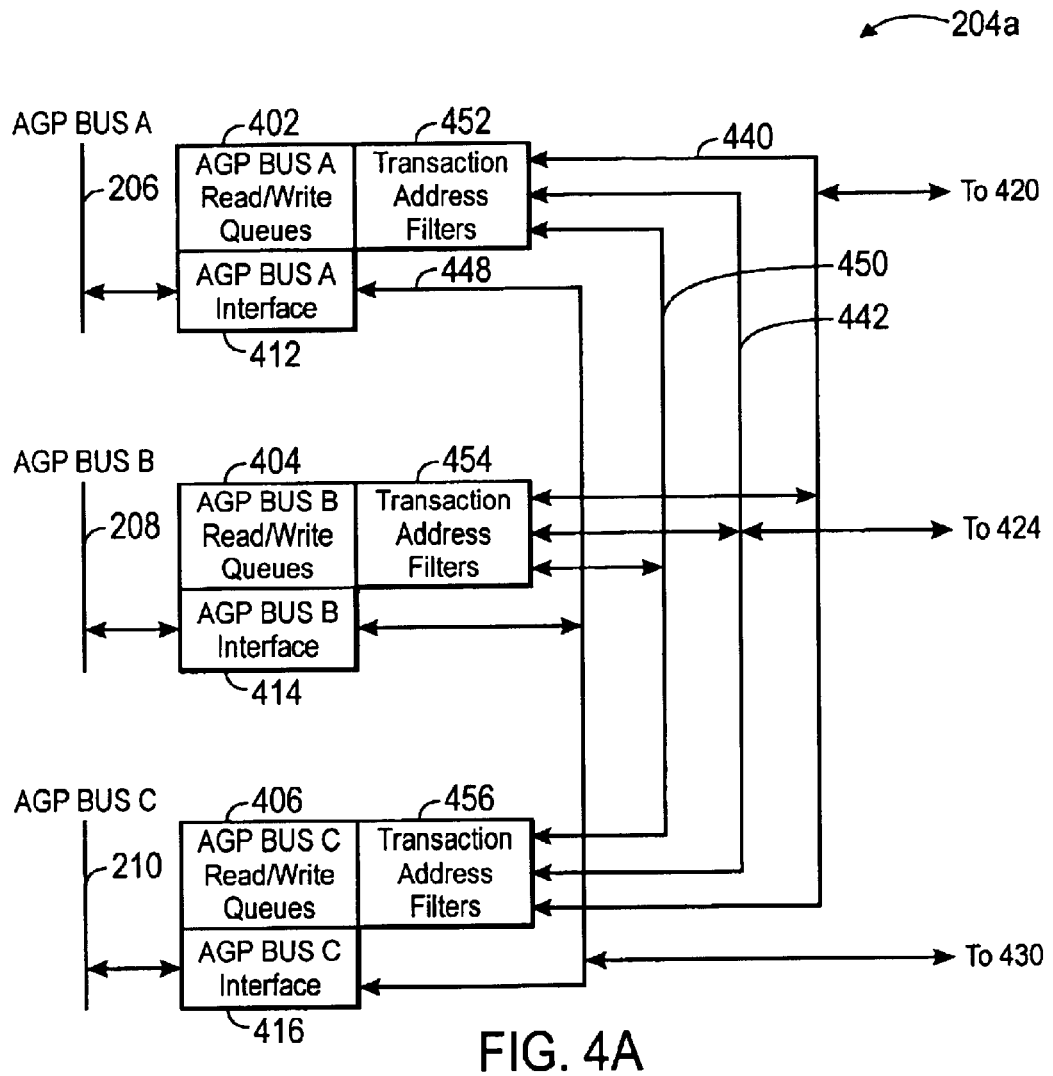
FIG. 4A is a partial schematic functional block diagram of a further embodiment of the present invention according to FIG. 4.

Referring now to FIG. 4A, a partial schematic functional block diagram of a further embodiment of the invention of FIG. 4 is illustrated. The core logic 204a is similar to the core logic 204 illustrated in FIG. 4, but with the addition of transaction address filters 452, 454, 456 connected between the AGP read/write queues 402,404,406, respectively, and the internal buses 440, 442, 450. The purpose of the transaction address filters 452, 454, 456 is to allow only those AGP transactions intended for the specific AGP devices connected to the AGP buses 206, 208, 210, respectively. The transaction address filters 452, 454, 456 may comprise registers or other mechanisms for storage (not illustrated) which store the memory and 10 address ranges of each AGP device connected to the respective AGP bus (206, 208, 210), and logic which only allows transactions having addresses which fall within these address ranges to pass to the respective AGP read/write queues 402, 404, 406. The transaction address filters 452, 454, 456, thus prevent unnecessary AGP bus traffic on the physical buses not connected to the intended target AGP devices. This may reduce transaction latency time when peer-to-peer AGP bus transactions are occurring and host-to-AGP or AGP-to memory transactions are also occurring concurrently therewith. If all AGP devices are graphics devices then there is no need to do address comparison or write ordering. During bus enumeration, the bridge determines which device is on which physical bus and can thus maintain write ordering of each device accordingly. In the case of graphics devices, the transfer will happen without any wait states to optimize for graphics performance.

Host-to-AGP transactions, typically, have a higher priority than other AGP transactions such as memory or peer-to-peer transactions. In the present invention, it is contemplated that peer-to-peer AGP transactions may be enabled or disabled under software control by setting a hit in a register in the core logic 204 (not illustrated). When peer-to-peer AGP transactions need to occur, there is a possibility of the peer-to-peer AGP transactions being starved due to heavy host-to-AGP transactions. The present invention solves this problem by allowing at least one AGP-to-AGP transaction to occur between host-to AGP transactions. For example, the AGP target flow controller 430 (FIG. 4) observes that a AGP-to-AGP transaction is pending and asserts a processor "retry" on control bus 446 which causes the CPU interface 422 to assert a processor retry signal on the host bus 103. This processor retry signal may be the Backoff (BOFF#) input for 486 and PENTIUM type processors, or a Retry Response (DEFER# asserted with HITM# inactive during the Snoop Phase) for the PENTIUM PRO processors. Other types of processors have similar types of processor retry inputs and are well known to those skilled in the art of microcomputer and microprocessor design. Once the AGP-to-AGP transaction is underway, the processor "retry" signal is deasserted and another host-to-AGP transaction request is allowed to occur. The present invention thus alternates between host-to-AGP transactions and AGP-to-AGP transactions if both are pending.

The PCI Specification requires that the bridges must follow certain transaction ordering rules to avoid "deadlock" and/or maintain "strong" ordering. These rules may also be followed for AGP bridges. To guarantee that the results of one AGP initiator's write transactions are observable by other AGP initiators in the proper order of occurrence, even though the write transactions may be posted in the AGP bridge queues, the following rules must be observed:

1) Posted memory writes moving in the same direction through an AGP bridge will complete on the destination bus in the same order they complete on the originating bus;

2) Write transactions flowing in one direction through an AGP bridge have no ordering requirements with respect to write transactions flowing in the other direction of the PCI bridge; and 3) Posted memory write buffers in both directions must be flushed or drained before starling another read transaction.

A "retry" is defined in the PCI Specification as a termination requested by a target before any data is transferred because the target is busy and temporarily unable to process the transaction. An "AGP retry" may be defined as a termination requested by a target before any data is transferred because the target is busy and temporarily unable to process the transaction. The AGP target flow controller 430 issues a "AGP retry" over control bus 448 during the first transaction data phase if there is M byte aligned address commonality, where $M=16\times2^n$ and n is 0, 1, 2, 3, 4, etc., as determined by the AGP address comparator 428, thus concurrent data is prevented from being transferred during any M byte aligned address transactions where a write transaction is involved. The AGP retry is indicated to the AGP device initiator by the respective AGP bus interface (412, 414 or 416) asserting Stop ("STOP#") and deasserting Target Ready ("TRDY#") while keeping Device Select ("DEVSEL#") asserted. This tells the AGP transaction initiator that the AGP target does not intend to complete transaction (TRDY# deasserted) and that the AGP transaction initiator must stop the transaction on this data phase (STOP# asserted). The continued assertion of DEVSEL# indicates that the AGP transaction initiator must retry the transaction at a later time (when the commonly addressed transaction on the other AGP physical bus has completed). Furthermore, the AGP transaction initiator must use the exact same address, command and byte enables. If it is a write transaction, it must use exactly the same data in the first data phase. The access must be retried until the transaction is completed. In this way, transactions which have M byte aligned addresses and involve a write transaction, therefore should not occur concurrently, are thus easily handled by the core logic 204.

Each AGP device embedded on the computer system motherboard, or as a device card inserted into the AGP connectors 306, 308, 310, 314 (FIG. 3) requires request (REQ#) and grant (GNT#) signals. According to the AGP Specification, a AGP device is selected and allowed to become the AGP bus initiator when it asserts its respective REQ# signal onto the AGP bus and the AGP arbiter acknowledges the AGP device bus initiator request by asserting the respective GNT# signal back to AGP device requesting the AGP bus. In the core logic 204 of the present invention, a plurality of request and grant signals are available for all of the AGP devices in the computer system. The AGP arbiter 432, through the respective AGP bus interface, may assert a grant signal to another PCI device requesting a transaction before the present AGP device transaction is finished as disclosed above.

An additional feature of the present invention is the ability to operate with a "mixed mode" of AGP compatible devices and non-AGP (i.e., PCI) devices. Such a mixed mode configuration is shown in FIG. 413. Referring to FIG. 4B, the core logic 204 is shown in the center. The host bus 103 and the memory bus 105 are both connected to the core logic 204. As before, the core logic 204 contains the target flow controller 430, an arbiter 432, and an address comparator 428. In addition, one or more configuration memory registers 462 are provided to retain the configuration information regarding the various devices connected to the core logic. This configuration may be determined upon startup (POST) or later by a standard polling mechanism. The configuration information, such as whether a particular device is AGP compatible, its attendant address range, and its bandwidth capabilities, are stored in the configuration registers 462. Alternatively, the configuration information can be kept in main memory (system RAM) 106. In one embodiment of the present invention, a clock 464 is also provided within the core logic 204. However, the run time clock 144 (see FIG. 2) or some other system clock could be used instead.

Figure 5:
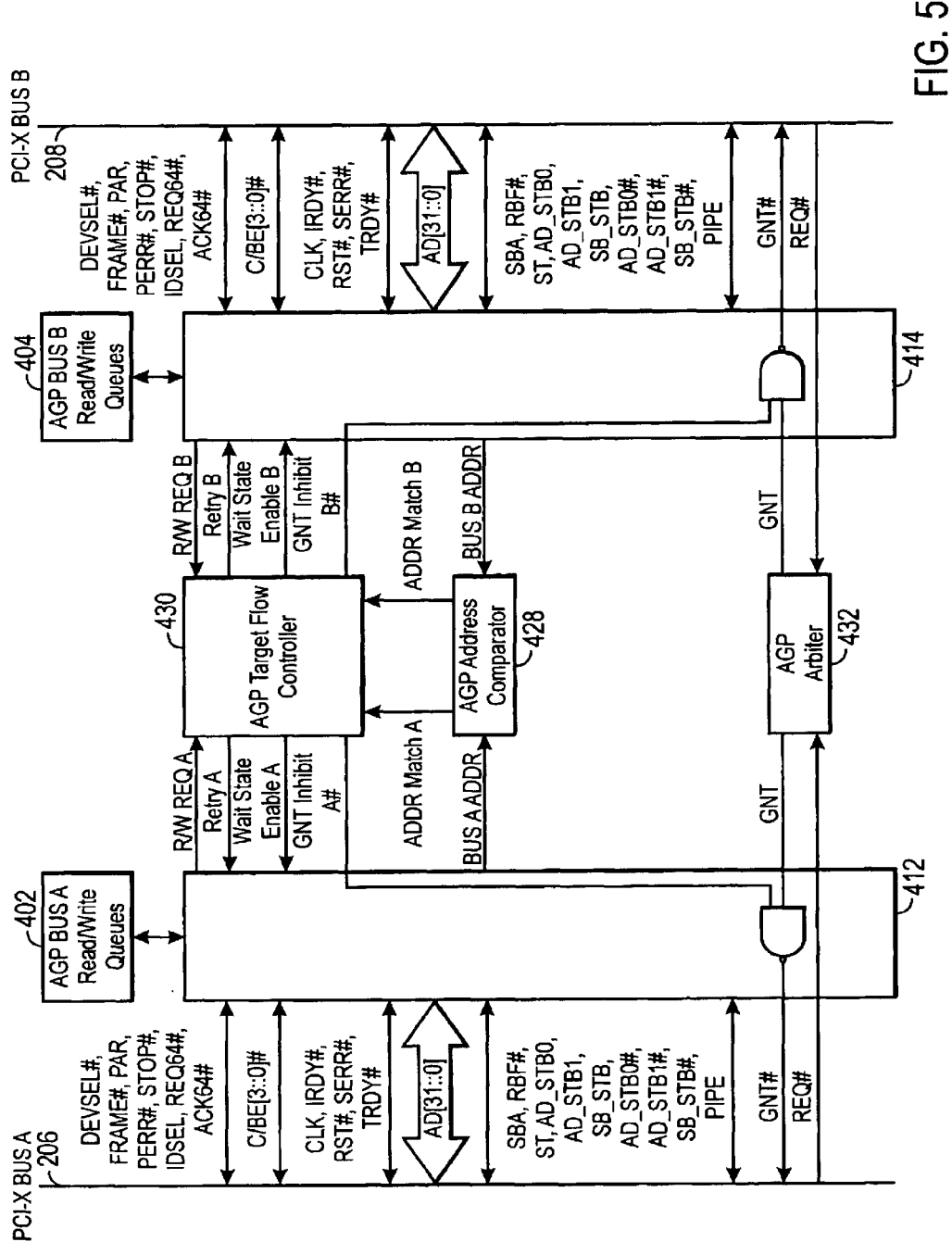
FIG. 5 is a schematic functional block diagram of a portion of the invention of FIG. 4.

Referring now to FIG. 5, a schematic functional block diagram of an embodiment of a portion of the invention of FIG. 4 is illustrated. Signals shown in FIG. 5 are for a system that is compliant with the AGP 2.0 Specification. For clarity only two of the separate physical AGP buses 206, 208 and their respective AGP bus interfaces 412, 414 are illustrated. More than two physical AGP buses, however, are contemplated herein for the present invention. All AGP bus signals are connected between the AGP buses 206, 208 and their respective bus interfaces 412, 414. A 32-bit address and data bus (AD [31::0]) is illustrated but a 64-bit address and data bus (AD[63::0]) is also contemplated herein as more fully defined in the PCI Specification.

For example, a transaction occurring with AGP device A (not illustrated) on the AGP bus 206 (bus A), generates addresses on the AGP bus 206 which are also sent to the AGP address comparator 428 (bus A addr). When a transaction is requested (REQ#) by another AGP device B (not illustrated) on the AGP bus 208 (bus B), a grant (GNT#) is issued by the AGP arbiter 432 to the PCI device B. Once the grant is received by the AGP device B, the AGP device B asserts its transaction address on the AGP bus 208. The asserted address from the AGP device B is sent to the AGP address comparator 428 where the AGP device B address is compared with the current transaction address of the AGP device A. In order for the AGP address comparator 428 to compare the addresses from each one of the AGP devices A, B, a wait state is initiated by the AGP target flow controller 430 (wait state enable B) to the AGP bus interface 414. The AGP bus interface 414 causes a wait state to occur by delaying (blocking) assertion of Target Ready (TRDY#) from the target AGP device to the AGP device B which is the initiator of the new transaction on the AGP bus 208. If the compared prefetchable memory addresses are not to the same cache-line, nor are they M byte aligned, where M=16× $2^n$ and n is 0, 1, 2, 3, 4, etc., then the AGP bus interface 414 allows assertion of (unblocks) TRDY# from the target AGP device and the transaction on the AGP bus 208 proceeds to its data phase. Thus, concurrent transactions may occur on the AGP buses 206, 208. However, if the compared addresses are the same or are M byte aligned, then the AGP target flow controller initiates a AGP Retry (retry b) to the AGP bus interface 414 which issues a AGP Retry to the AGP device B. AGP Retry need only be asserted when one or both of the AGP devices A, B are doing or intend to do write transactions. Since the ordering rules are always "strong" in this embodiment of the present invention, pending write queues are emptied first before starting the next transaction having aligned addresses.

Figure 5A:
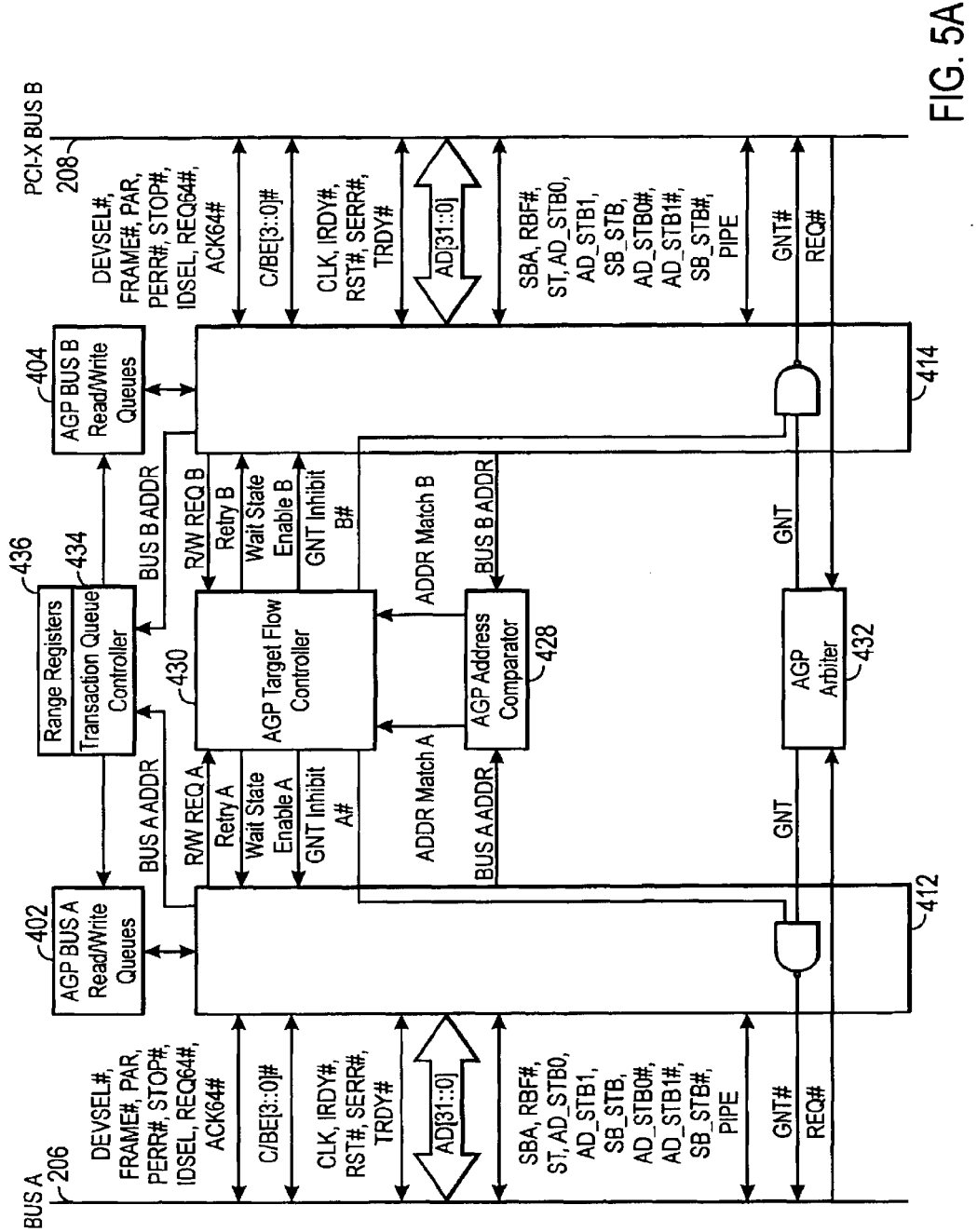
FIG. 5A is a schematic functional block diagram another embodiment of a portion of the invention of FIG. 4.

Referring now to FIG. 5A, a schematic functional block diagram of another embodiment of a portion of the invention of FIG. 4 is illustrated. Signals shown in FIG. 5A are for a system that is compliant with the AGP 2.0 Specification. Operation of the embodiment illustrated in FIG. 5A is similar to the embodiment of FIG. 5 except that range registers 436 and transaction queue controller 434 have been added so that when "weak" ordering of memory transactions is appropriate, out-of-order AGP transactions such as read transactions bypassing posted write transactions may be performed to reduce latency of the AGP bus transactions. It is contemplated in this embodiment that there is at least one pair of range registers for each AGP device in the computer system. The at least one pair of range registers holds the upper and lower memory addresses of the respective AGP device which require "strong" ordering for that AGP device. Any AGP memory transactions outside of the "range" of memory addresses defined by the upper and lower memory addresses stored in the pair of range registers would not require "strong" ordering, thus "weak" ordering may be used to improve bus transaction latency.

The transaction queue controller 434 determines whether an AGP device transaction requires "strong" or "weak" ordering by comparing the current and pending transaction addresses in the queues 402, 404 with the corresponding AGP device address ranges defined by the range registers 436. When the current and pending transaction addresses do not correspond to those in the range registers 436, the transaction queue controller 434 may instruct the AGP target flow controller 430 to advance transactions out of order and/or do read transactions before the write transactions ("weak" ordering) have been flushed from the queues 402, 404. On the other hand, when the current and pending transaction addresses do correspond to those in the range registers 436, the transaction queue controller 434 instructs the AGP target flow controller 431) to advance transactions in accordance with the aforementioned AGP Specification ordering rules ("strong" ordering).

Figure 5B:
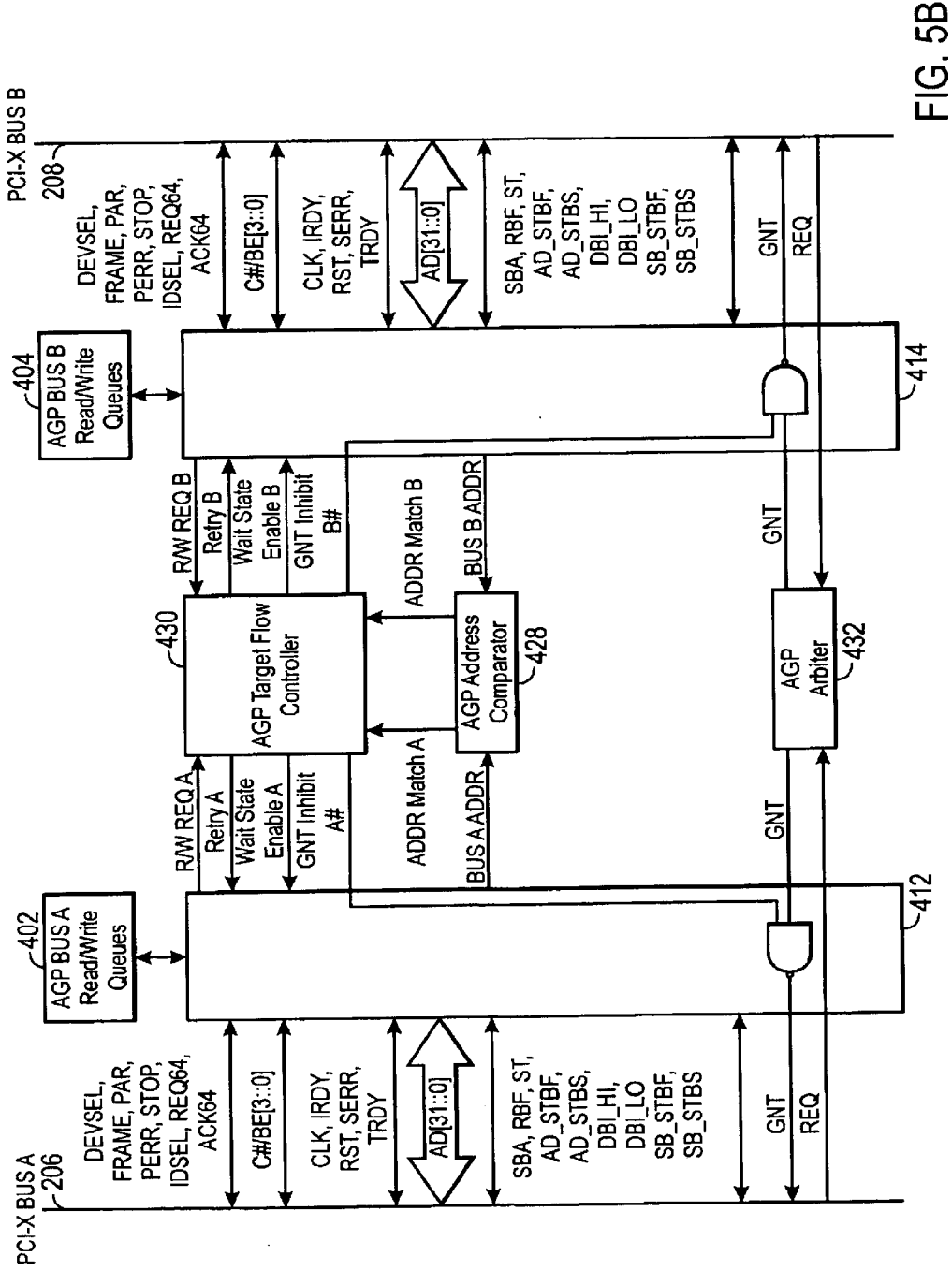
FIG. 5B is a schematic functional block diagram of a portion of the invention of FIG. 4.
Figure 5C:
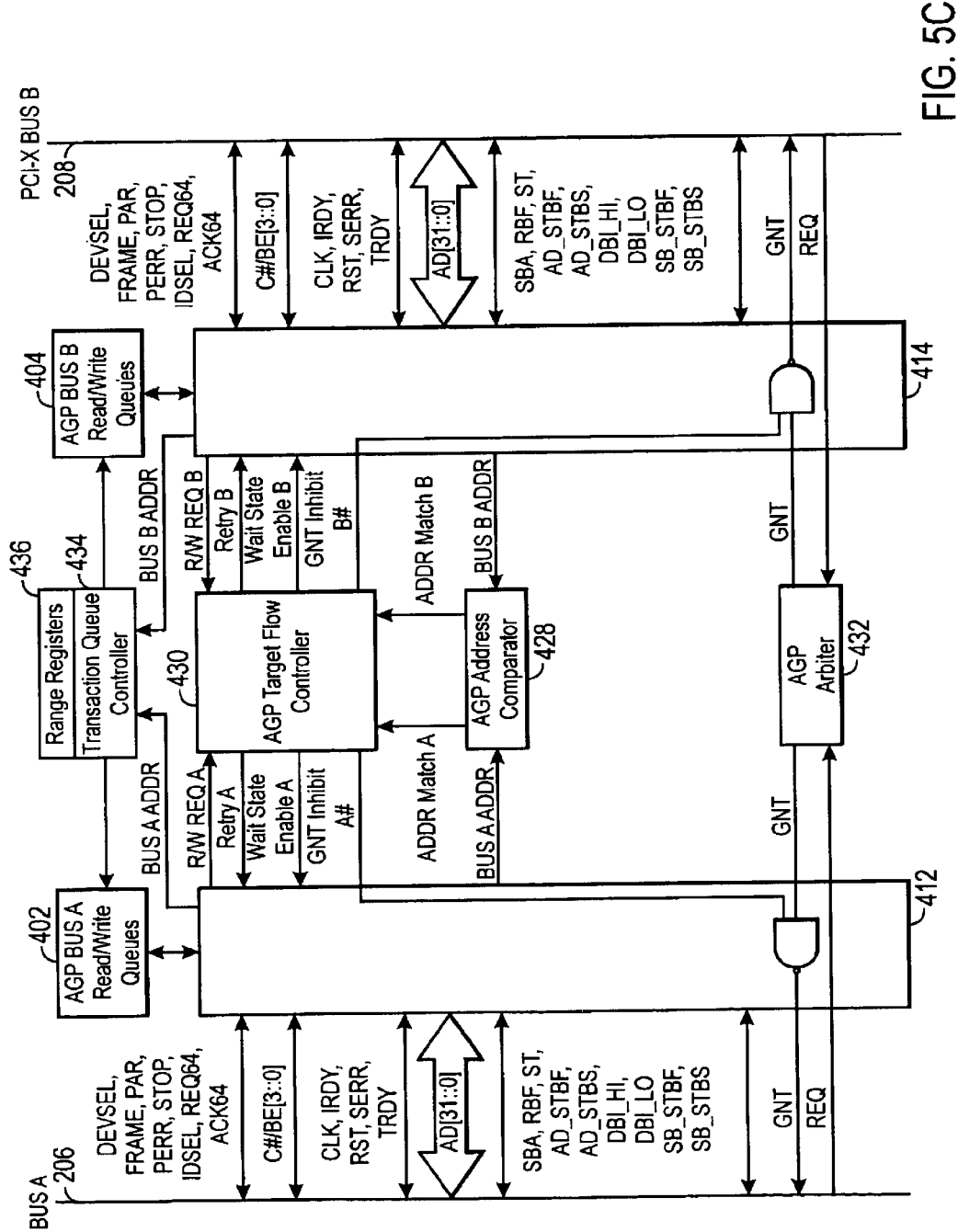
FIG. 5C is a schematic functional block diagram another embodiment of a portion of the invention of FIG. 4.

FIG. 5B and FIG. 5C are similar, respectively, to FIG. 5 and FIG. 5A. FIG. 5B and FIG. 5C show signals for a system that is compliant with the AGP 3.0 Specification.

Figures 5D, 6:
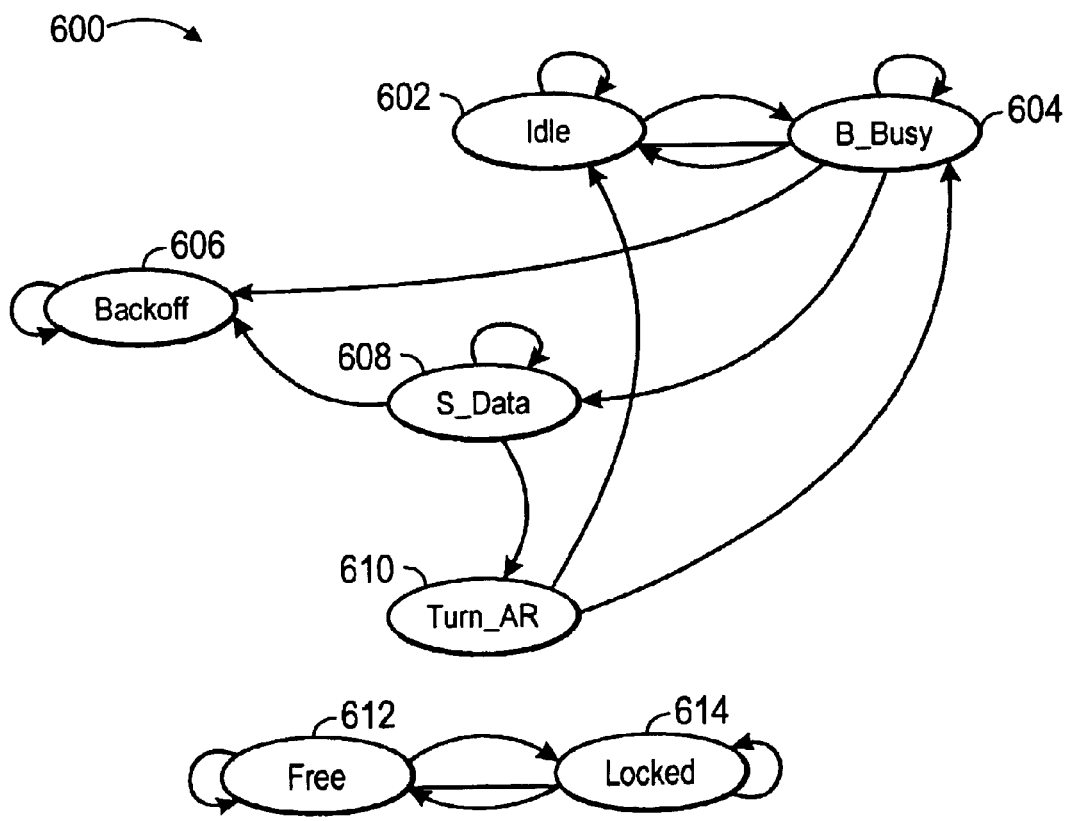
FIG. 5D is a schematic representation of range registers in a portion of an embodiment of the invention according to FIG. 5A.
FIG. 6 is a schematic state diagram of the present invention.

Referring now to FIG. 5D, a schematic representation of range registers according to the aforementioned embodiment of the present invention is illustrated. Each AGP device(x), where x is a to n, has a tag ID register 502 and at least one pair of range registers 504, 506 associated therewith. The lower address range register 506 may contain the lowest memory address of interest to the associated AGP device. The range register 506 may be a full 32 or 64-bit register and contain the absolute value lower address. The upper address range register 504 may contain only the offset address of the address stored in the range register 506, i.e., the contents of the range register 504 is added to the contents of the range register 506 to give the absolute value upper memory address of interest to the associated AGP device. A plurality of range register pairs also may be associated with a AGP device, thus allowing non-contiguous memory address ranges to be programmed for a particular AGP device. The computer system startup software during POST, or an API or applications program may also load the range registers 504, 506 with the desired memory address ranges that require strong ordering of AGP transactions. The remaining memory addresses which fall outside of the strong ordering address ranges may be treated by the present invention as weak ordering which allows AGP transactions to be taken out of order so as to improve AGP bus transaction latency times.

Referring to FIG. 6, a schematic state diagram of the present invention is illustrated. Signal conventions hereinafter are the same or similar to those disclosed in Appendix B of the PCI Specifications incorporated herein by reference. The present invention functions substantially the same as the state machine represented and described in Appendix B of the PCI 2.1 Specification.

Figure 7:
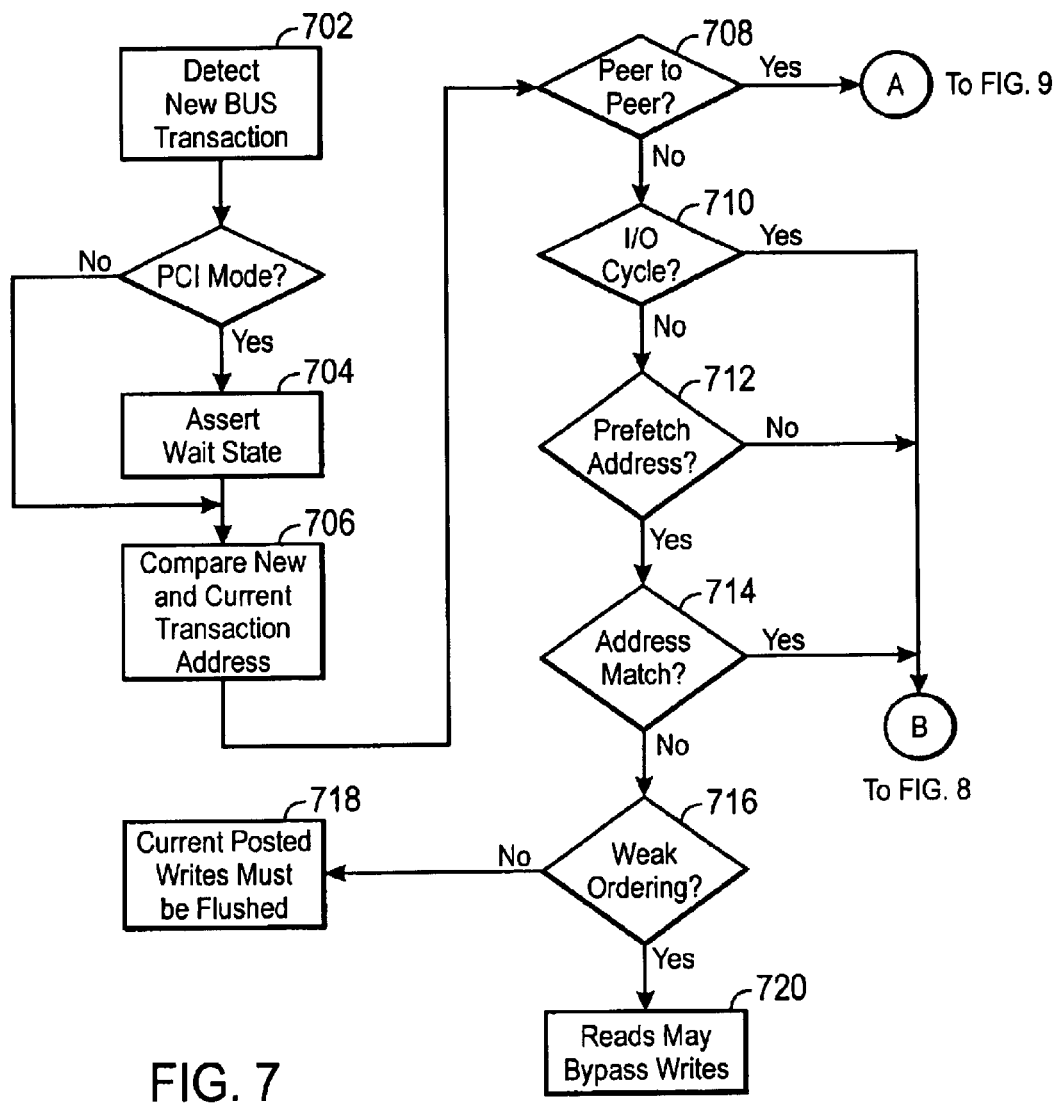
FIGS. 7, 8, 9 and 10 are process flow diagrams of the present invention.
Figure 8:
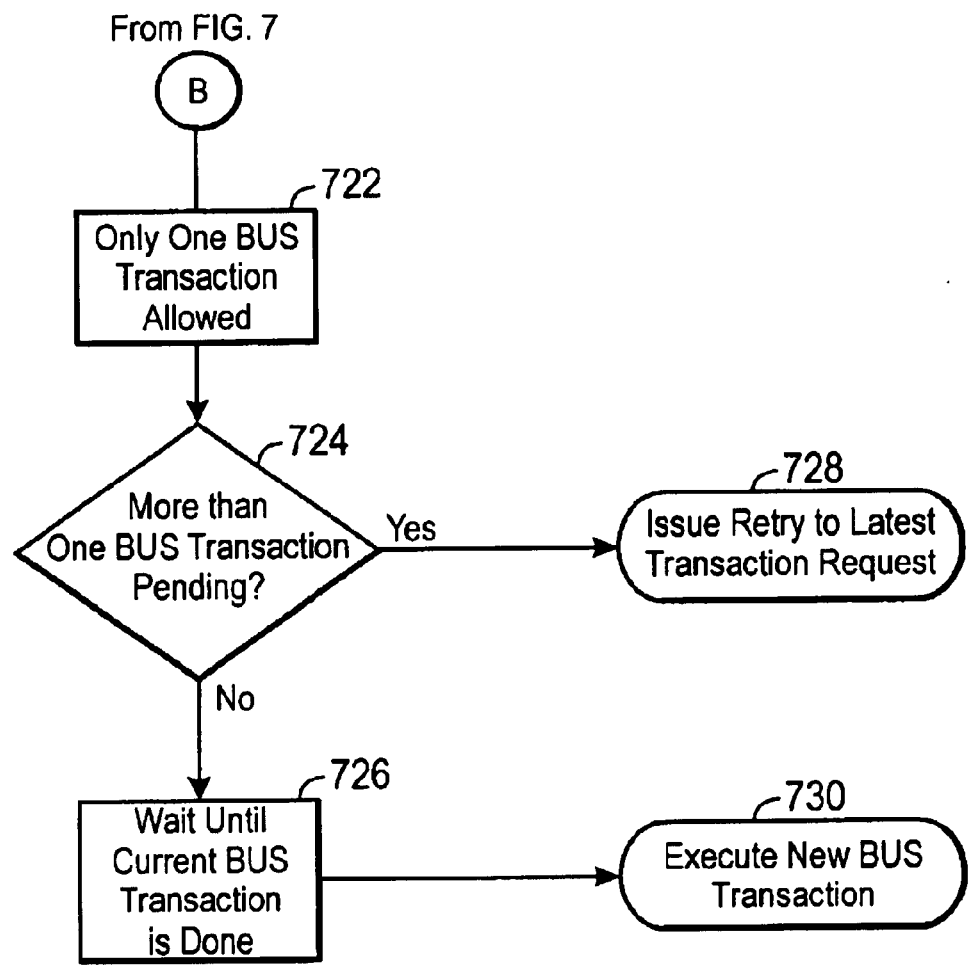
Figure 9:
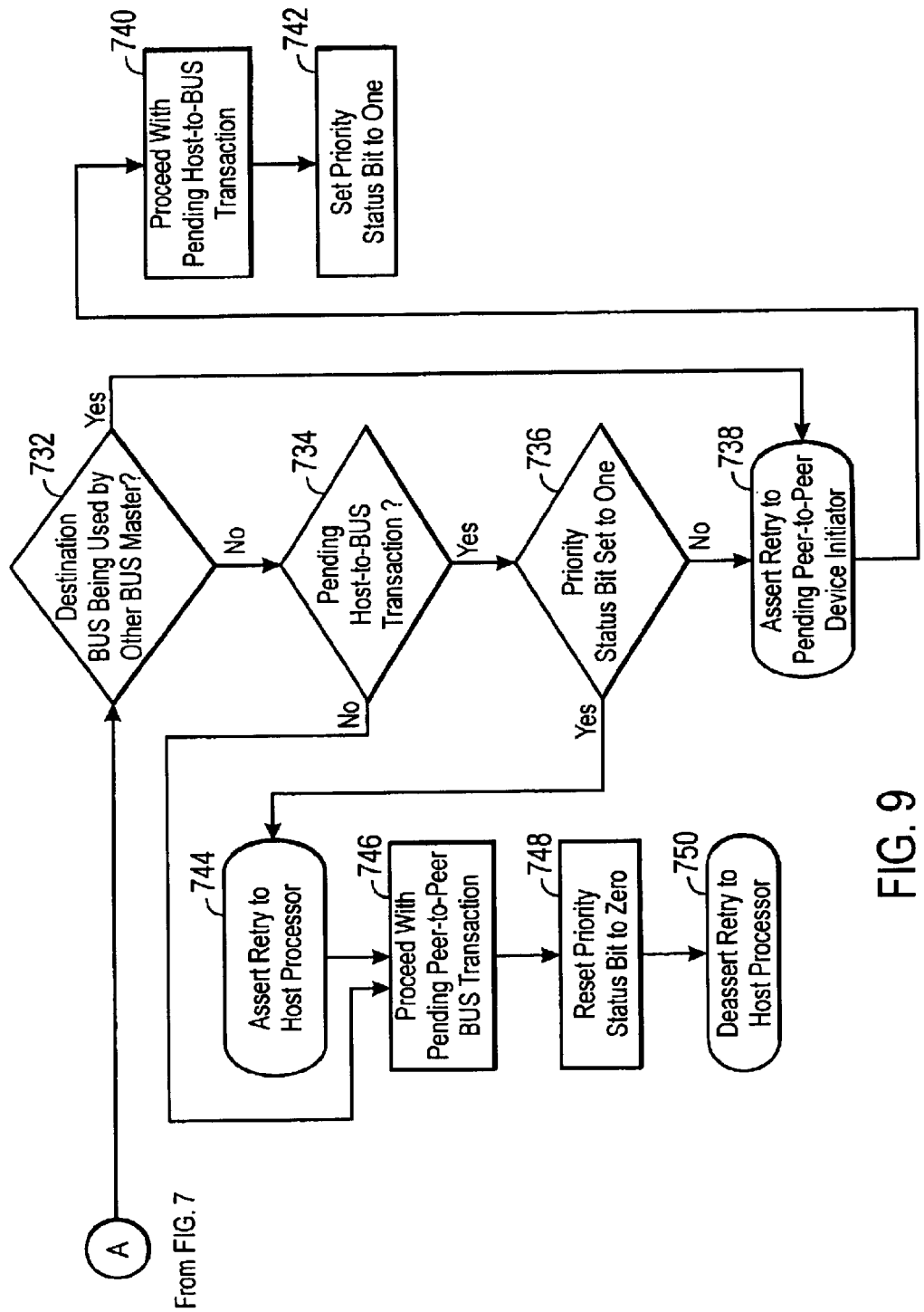

Referring now to FIGS. 7, 8 and 9, a process flow diagram of the present invention is illustrated. The aforementioned process flow diagram describes the operation of preferred embodiments of the present invention. In step 702, the present invention detects a AGP bus transaction(s) and in step 704 asserts a wait state. The step 704 wait state is used to allow sufficient time for comparison of a current AGP transaction address with a new (pending) AGP transaction address in step 706. During the address comparison in step 706, the present invention determines from the pending transaction address whether the pending transaction is a peer-to-peer (decision step 708), an I/O cycle (decision step 710), or a prefetchable memory (decision step 712) transaction, and whether there is an address match or M byte aligned, where M=16×$2^n$ and n is 0, 1, 2, 3, 4, etc., address commonality (decision step 714).

Host-to-AGP transactions, typically, have a higher priority of execution than either AGP-to-memory or AGP-to-AGP transactions. The logic of the present invention will alternate (flip-flop) between execution of a host-to-AGP transaction and a peer-to-peer AGP transaction so that the peer-to-peer AGP transactions are not "starved" by the higher priority host-to-AGP transactions. Decision step 708 determines whether there is a peer-to-peer AGP transaction pending. Decision step 732 determines if the destination AGP bus required by the pending peer-to-peer AGP transaction is being used by another AGP bus master, i.e., a AGP transaction is occurring on the destination AGP bus needed for the pending peer-to-peer AGP transaction. If the destination AGP bus is not being used, then decision step 734 determines if there is a pending host-to-AGP transaction. If there is a pending host-to-AGP transaction, then decision step 736 determines if a priority status bit is set to one. The priority status bit may be a bit in a status register in the core logic of the present invention and may be used as a one bit flip-flop register to indicate the last type of AGP transaction to occur, i.e., execution of a host-to-AGP transaction sets the status bit to "one" and execution of a peer-to-peer AGP transaction resets the status bit to "zero." Thus, by reading this status bit, the present invention may determine at any time whether a host-to-AGP transaction or a peer-to-peer AGP transaction occurred last.

If the decision step 736 determines that the status bit is not "one" then a peer-to-peer AGP transaction occurred last, and the pending host-to-AGP transaction should execute next. This is accomplished in step 738 by asserting a AGP retry to the peer-to-peer AGP initiator which causes this AGP initiator to drop its AGP bus request and retry the same request later. In step 740, the host-to-AGP transaction proceeds to execution, and in step 742, the status bit is set to one" so that the next peer-to-peer AGP transaction request will be given priority over a host-to-AGP transaction request.

If the decision step 736 determines that the status bit is set to "one" then a host-to-AGP transaction occurred last, and the pending peer-to-peer AGP transaction should execute next. This is accomplished in step 744 by asserting a retry to the host processor which causes the host processor to drop its AGP bus request and retry the same request later. In step 746, the peer-to-peer AGP transaction proceeds to execution, and in step 748, the status bit is set to "zero" so that the next host-to-AGP transaction request will be given priority over a peer-to-peer AGP transaction request. Step 750 deasserts the retry to the host processor.

In decision step 732, if the required destination AGP bus is being used for another AGP transaction, then a retry signal is asserted to the pending peer-to-peer PCI initiator in step 738. This causes the pending peer-to-peer AGP initiator to retry its transaction request later. If there is a host-to-AGP transaction pending, step 740 allows the host-to-AGP transaction to proceed, and step 742 will then set the priority status bit to one as described above.

The decision step 710 determines whether the pending AGP transaction is a memory address or an I/O address. If a memory address, decision step 712 determines whether the pending AGP transaction is a prefetchable memory address. Decision step 714 then determines whether the pending and current AGP transactions are accessing the same cache-line or have M byte aligned addresses, where M=16×$2^n$ and n is 0, 1, 2, 3, 4, etc. If there is no address match or alignment of the current and pending AGP transactions, then decision step 716 determines whether the pending AGP transaction requires weak or strong ordering. In step 718, strong ordering requires that all current posted writes must be flushed before a read transaction may proceed, in accordance with the AGP Specification. In step 720, weak ordering allows read transactions to bypass current posted write transactions which may improve AGP bus transaction latency times.

If step 710 determines that the pending AGP transaction is an I/O cycle, step 712 determines that the pending AGP transaction is not a prefetchable memory address, or step 714 determines that the pending and current AGP transactions are accessing the same cache-line or have M byte aligned addresses, where $M=16\times2^n$ and n is 0, 1, 2, 3, 4, etc., then step 722 allows only one AGP transaction to occur. Decision step 724 determines whether more than one AGP transaction is pending and if so, step 728 issues a retry to the AGP device making the latest transaction request, thus forcing this AGP device to retry its request at a later time. When only one AGP transaction is pending, step 726 lets that single pending AGP transaction to wait by not asserting its GNT# signal until the current AGP transaction has finished. When the current AGP transaction is finished, the GNT# signal is asserted so that the pending AGP transaction may execute in step 730.

Figure 10:
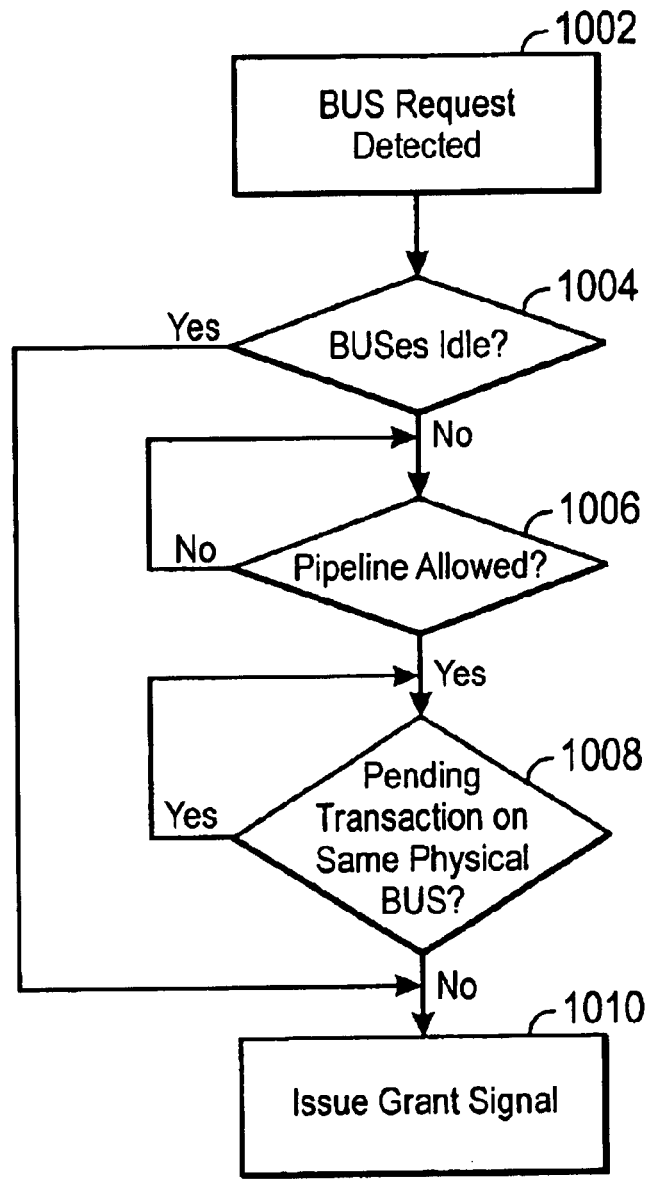

Referring now to FIG. 10, a process flow diagram of the arbiter of the present invention is illustrated. An AGP transaction request, REQ#, is detected in step 1002 and decision step 1004 determines whether the AGP buses are idle or not. If the AGP buses are idle, then a grant signal, GNT#, is returned in step 1010 to the requesting AGP device. If any of the AGP buses are not idle, i.e., there is current AGP transaction in progress, then decision step 1006 determines if pipelined AGP transactions are allowed. Decision step 1008 determines whether the current and pending transactions are on the same or different physical AGP buses.

If step 1006 determines that pipelined AGP transactions are allowed and step 1008 determines that the current and pending AGP transactions will be on different physical AGP buses, the step 1010 allows the grant signal, GNT#, to be returned to the AGP device requesting a pending AGP transaction. Otherwise, GNT# is not returned to the requesting AGP device until the current AGP transaction has completed.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system having a core logic chip set capable of bridging between a processor host bus, memory bus and a plurality of Accelerated Graphics Port (AGP) buses wherein the plurality of AGP buses each have the same logical AGP bus number, the system comprising:

a central processing unit connected to a host bus;

a random access memory connected to a random access memory bus;

a core logic chip set connected to the host bus and the random access memory bus;

the core logic chip set configured as a first interface bridge between the host bus and the random access memory bus;

the core logic chip set configured as a plurality of second interface bridges between the host bus and a plurality of AGP buses the core logic chip set configured as a plurality of third interface bridges between the memory bus and the plurality of AGP buses, wherein the plurality of AGP buses are physically separate but have the same logical AGP bus number;

a AGP address comparator;

a AGP arbiter for receiving request signals from and issuing grant signals to AGP devices connected to the plurality of AGP buses; and a AGP target flow controller;

the AGP address comparator receiving transaction addresses from the plurality of AGP bus interfaces, wherein the transaction addresses are compared and an address match is found if the transaction addresses from two or more of the plurality of AGP bus interfaces are the same or are within M bytes of each other, where $M=16\times2^n$ and n is zero or a positive integer number, then the AGP address comparator sends an address match signal to the AGP target flow controller which causes a retry signal to be issued from the one of the plurality of AGP bus interfaces that corresponds to the newest transaction request causing the address match, if the transaction addresses from two or more of the plurality of AGP bus interfaces are not the same nor are the transaction addresses within M bytes then no address match signal is generated.

2. The computer system of claim 1, further comprising at least one AGP device, the at least one AGP device connected to at least one of the plurality of AGP buses.

3. The computer system of claim 2, wherein the at least one AGP device runs at a clock of 66 MHz.

4. The computer system of claim 2, further comprising plurality of address range register pairs, wherein a first one of the pair contains a lower memory address and a second one of the pair contains an upper memory address for each of the at least one AGP devices in the computer system.

5. The computer system of claim 4, further comprising a transaction queue controller, the transaction queue controller comparing current and pending memory transaction addresses with the addresses represented by the plurality of address range register pairs so that when a match is found between the current and pending memory transaction addresses and those addresses represented in the plurality of address range register pairs then strong ordering is used for transaction execution and when a match is not found then weak ordering is used for transaction execution.

6. The computer system of claim 1, further comprising transaction address filters for each of the plurality of AGP buses, wherein only AGP transactions addressed to a AGP device connected to a one of the plurality of AGP buses is allowed to be broadcast on the one of the plurality of AGP buses.

7. The computer system of claim 1, further comprising the core logic chip set configured as a plurality of fourth interface bridges between the plurality of AGP buses for peer-to-peer AGP transactions.

8. The computer system of claim 7, wherein a peer-to-peer AGP transaction is broadcast on only a one of the plurality of AGP buses which is connected to a target AGP device.

9. The computer system of claim 8, wherein a peer-to-peer AGP transaction is broadcast to an AGP device connected to a one of the plurality of AGP buses through a transaction filter which allows the AGP transaction to be broadcast only on the one of the plurality of AGP buses.

10. The computer system of claim 1, further comprising logic for maintaining write ordering according to the PCI specification.

11. The computer system of claim 1, further comprising the PCI target flow controller generating a wait state signal during comparison of the transaction addresses in the AGP address comparator.

12. The computer system of claim 1, wherein the AGP target flow controller does not cause the retry signal to be issued if the transaction addresses are only for read transactions.

13. The computer system of claim 1, wherein a plurality of AGP bus transactions may run concurrently between the plurality of AGP bus read/write queues and the random access memory read/write queues.

14. A method, in a computer system having a core logic chip set capable of bridging between a processor host bus, memory bus and a plurality of Accelerated Graphics Port (AGP) buses wherein the plurality of AGP buses each have the same logical bus number, the method comprising the acts of:

providing a central processing unit connected to a host bus;

providing a random access memory connected to a random access memory bus;

providing a core logic chip set connected to the host bus and the random access memory bus;

configuring the core logic chip set as a first interface bridge between the host bus and the random access memory bus;

configuring the core logic chip set as a plurality of second interface bridges between the host bus and a plurality of AGP buses, wherein the plurality of AGP buses are physically separate but have the same logical AGP bus number;

configuring the core logic chip set as a plurality of third interface bridges between the random access memory bus and the plurality of AGP buses;

providing an AGP address comparator;

providing an AGP arbiter for receiving request signals from and issuing grant signals to AGP devices connected to the plurality of AGP buses; and providing an AGP target flow controller;

the AGP address comparator receiving transaction addresses from the plurality of AGP bus interfaces, wherein the transaction addresses are compared and an address match is found if the transaction addresses from two or more of the plurality of AGP bus interfaces are the same or are within M bytes of each other, where $M=16\times2^n$ and n is zero or a positive integer number, then the AGP address comparator sends an address match signal to the AGP target flow controller which causes a retry signal to be issued from the one of the plurality of AGP bus interfaces that corresponds to the newest transaction request causing the address match, if the transaction addresses from two or more of the plurality of AGP bus interfaces are not the same nor are the transaction addresses within M bytes then no address match signal is generated.

15. The method of claim 14, further comprising the act of configuring the core logic chipset to maintain write ordering in accordance with the PCI specification.

16. The method of claim 14, wherein peer-to-peer AGP bus transactions occur between the plurality of AGP bus read/write queues.

17. The method of claim 14, further comprising the acts of:

storing a lower memory address in a lower range register associated with an AGP device;

storing an upper memory address in an upper range register associated with the AGP device;

comparing a transaction memory addresses with a range of addresses between the stored lower and upper memory addresses;

using strong ordering for AGP transactions when the transaction memory addresses thereof are found within the range of addresses; and using weak ordering for AGP transactions when the transaction memory addresses thereof are not found within the range of addresses.

18. The method of claim 14, further comprising the steps of:

storing memory and I/O addresses, associated with each AGP device connected to a one of the plurality of AGP buses, in a plurality of transaction address filter registers, each of the plurality of transaction address filter registers associated with a respective one of the plurality of AGP buses; and comparing an AGP transaction address with the stored memory and I/O addresses in the plurality of transaction address filter registers to determine which one of the respective one of the plurality of AGP buses the AGP transaction address should be broadcast on.

19. A core logic chip set capable of bridging between a processor host bus, memory bus and a plurality of Accelerated Graphics Port (AGP) buses wherein the plurality of AGP buses each have the same logical AGP bus number, comprising:

a plurality of AGP bus read/write queues;

a plurality of AGP bus interfaces adapted for connection to a plurality of AGP buses;

the plurality of AGP bus read/write queues connected to the plurality of AGP bus interfaces, wherein read and write transactions through the plurality of AGP bus interfaces are stored in the plurality of AGP bus read/write queues;

processor read/write queues;

a processor interface connected to the processor read/write queues, the processor interface adapted for connection to a processor host bus;

random access memory read/write queues;

a random access memory interface connected to the random access memory read/write queues, the random access memory interface adapted for connection to a random access memory bus;

the random access memory queues connected to the processor read/write queues;

the plurality of AGP bus read/write queues connected to the random access memory queues;

the plurality of AGP bus read/write queues connected to the processor read/write queues;

an AGP address comparator;

an AGP arbiter adapted for receiving request signals from and issuing grant signals to AGP devices connected to the plurality of AGP buses; and an AGP target flow controller;

the AGP address comparator adapted to receive transaction addresses from the plurality of AGP bus interfaces, wherein the transaction addresses are compared and an address match is found if the transaction addresses from two or more of the plurality of AGP bus interfaces are the same or are within M bytes of each other, where $M=16\times2^n$ n is zero or a positive integer number, then the AGP address comparator sends an address match signal to the AGP target flow controller which causes a retry signal to be issued from the one of the plurality of PCI bus interfaces that corresponds to the newest transaction request causing the address match, if the transaction addresses from two or more of the plurality of AGP bus interfaces are not the same nor are the transaction addresses within M bytes then no address match signal is generated.

20. The core logic chip set according to claim 19, wherein the plurality of AGP bus read/write queues are adapted for peer-to-peer AGP bus transactions occurring there between.

* * * * *